United States Patent
Hewel

(10) Patent No.: US 7,927,710 B2
(45) Date of Patent: *Apr. 19, 2011

(54) SEMIAROMATIC POLYAMIDE MOLDING COMPOSITIONS AND THEIR USE

(75) Inventor: Manfred Hewel, Domat/Ems (CH)

(73) Assignee: EMS-Patent AG, Domat/Ems (CH)

( * ) Notice: Subject to any disclaimer, the term of this patent is extended or adjusted under 35 U.S.C. 154(b) by 116 days.

This patent is subject to a terminal disclaimer.

(21) Appl. No.: 12/115,268

(22) Filed: May 5, 2008

(65) Prior Publication Data

US 2008/0274355 A1    Nov. 6, 2008

(30) Foreign Application Priority Data

May 3, 2007   (EP) .................................... 07107474

(51) Int. Cl.
*C08K 3/34*    (2006.01)

(52) U.S. Cl. .................. 428/474.4; 428/475.5; 524/397; 524/447; 524/449; 524/451; 524/494; 524/496; 524/500

(58) Field of Classification Search .............. 428/474.4, 428/475.5; 524/494, 500, 397, 447, 449, 524/451, 496, 606

See application file for complete search history.

(56) References Cited

U.S. PATENT DOCUMENTS 3,454,536 A * 7/1969 Blaschke et al. .............. 528/347
4,607,073 A * 8/1986 Sakashita et al. ............. 524/404

FOREIGN PATENT DOCUMENTS

| DE | 69630260 T2 | 12/1899 |
| DE | 1495393 | 4/1969 |
| DE | 19513940 A1 | 1/1996 |
| JP | 2002-293926 A | 10/2002 |
| WO | 2004/015010 A1 | 2/2004 |

* cited by examiner

*Primary Examiner* — Leszek Kiliman
(74) *Attorney, Agent, or Firm* — Sughrue Mion, PLLC

(57) ABSTRACT

A polyamide molding composition having the constitution from 30 to 100% by weight of at least one 10T/6T copolyamide composed of from 40 to 95 mol % of 10T units, and from 5 to 60 mol % of 6T units, from 0 to 70% by weight of reinforcing materials and/or fillers, and from 0 to 50% by weight of additives and/or further polymers. Uses and processes for the preparation of this polyamide molding composition are described.

32 Claims, 2 Drawing Sheets

SEMIAROMATIC POLYAMIDE MOLDING COMPOSITIONS AND THEIR USE

TECHNICAL FIELD

The present invention relates to polyamide molding compositions based on a terephthalic acid copolyamide and to processes for their preparation, and to uses thereof.

PRIOR ART

Known standard polyamides, such as PA6 and PA66, are easy to process, and have high melting points and high heat deflection temperatures, particularly when they have glass-fiber reinforcement or comprise mineral fillers. However, they typically have high water absorptions up to 10% on storage in water. For many applications with stringent requirements for dimensional stability, including under wet or moist conditions, these aliphatic polyamides cannot be used. Water absorption alters not only dimensions but also mechanical properties. Water absorption reduces stiffness values and strength values to a fraction of their previous levels. In other words, problems arise when the standard polyamides are used in applications with mechanical load in contact with water or ambient moisture.

Long-chain aliphatic polyamides composed of aminoundecanoic acid (PA11) or laurolactam (PA12), or composed of dodecanediamine and dodecanedioic acid (PA1212) have low water absorption but have undesirably low melting points below 200° C. PA11, PA12, and PA1212 have low modulus and strength, even when dry. They are unsuitable for technical applications at relatively high temperatures.

Semiaromatic polyamides of PA6T/6I type, as described in U.S. Pat. No. 4,607,073 have reduced water absorption when compared with PA6 and PA66, and mechanical properties are substantially retained after water absorption. However, water absorption is still too high for precision parts (swelling), melting points are likewise too high, and the use of isophthalic acid markedly lowers crystallinity and crystallization rate, and there are problems with processability.

On the other hand, PA10T, as likewise disclosed in U.S. Pat. No. 4,607,073, has markedly reduced water absorption, and mechanical properties do not change on storage in water. The material is highly crystalline, and crystallizes very rapidly, a result being freezing within the nozzle during injection molding. Glass-fiber-reinforced PA10T has very irregular surfaces.

Semiaromatic polyamides of PA6T/NDT/INDT type, as described in U.S. Pat. No. 4,617,342, or of PA6T/6I/66 type as described in USRE 34,447E, or of PA6T/6/66 type as in EP 0 299 444, or of PA6T/MPMDT type as in EP 0 522 027 and EP 0 561 886 have reduced water absorption when comparison is made with PA6 and PA66, and mechanical properties are retained after water absorption. However, here again water absorption is still too high for precision parts (swelling). According to U.S. Pat. No. 5,098,940, the polyphthalamides of the USRE 34,447E mentioned and of the likewise abovementioned U.S. Pat. No. 4,617,342 also have long cycle times in injection molding and require high mold temperatures which cannot be achieved using water-heated molds.

The specification EP 0 659 799, EP 0 976 774, EP 1 186 634, and EP 1 375 578 describe semiaromatic polyamides composed of from 60 to 100 mol % of terephthalic acid and from 60 to 100 mol % of a diamine component composed of 1,9-nonanediamine and 2-methyl-1,8-octanediamine. These products feature good processability, excellent crystallinity, good heat deflection temperature, low water absorption, good chemicals resistance, and dimensional stability, and toughness. However, 2-methyl-1,8-octanediamine is currently not listed in the regulations either for existing substances or for new substances, and is therefore not approved in Europe. This inhibits rapid product introduction in the European market.

The documents EP 1 710 482, EP 1 741 549, and EP 1 741 553 claim multilayer pipes and multilayer hoses for the transport of chemicals and/or gases at high temperatures and multilayer structures with a semiaromatic polyamide composed of from 60 to 100 mol % of an aliphatic diamine having from 9 to 13 carbon atoms and from 50 to 100 mol % of terephthalic acid and/or naphthalenedicarboxylic acid. The examples use PA9T, PA9N, PA12T, and PA12N, in each case with 100 mol % of aliphatic diamine having from 9 to 12 carbon atoms. The description points out that other diamines, e.g. hexamethylenediamine, can be used within a range in which the excellent properties of the multilayer tubes, multilayer pipes, or multilayer structures are not impaired, and in an amount which is preferably 10 mol % or less.

EP 0 368 281 involves blends of ethylene-glycidyl methacrylate copolymer optionally with polyarylate and with a polyamide, prepared from an aliphatic or alicyclic diamine and from an aromatic dicarboxylic acid. Terephthalic acid is particularly emphasized as aromatic dicarboxylic acid. In relation to the aliphatic, linear or branched diamine having from 4 to 25 carbon atoms, said document mentions an enormous variety of possibilities. In the context of the enormous variety of possibilities mentioned, there is no express indication that the individual members of said list can also be used in the form of a mixture. If the specific examples in said document are examined, it is found that they disclose exclusively systems based on 1,6-hexanediamine, terephthalic acid, and isophthalic acid, or adipic acid (PA6T/6I and PA6T/66).

EP 0 697 429 very generally describes copolyamides based on aliphatic diamines having from 4 to 14 carbon atoms and terephthalic acid, having a particular distribution of the segments. Said document gives a wide variety of possibilities with regard to the selection of the diamine. Preferred diamines are 1,6-hexanediamine, 2-methyl-1,5-pentanediamine (MPMD), and 1,12-dodecanediamine. Preferred polyamides are PA6T/6I, PA6T/66, PA6T/6, PA6T/66/6I, PA6T/66/6, PA12T/66, PA12T/126, PA12T/6I, PA12T/12I, and PA12T/6. When the specific examples are examined, they reveal only systems with 1,6-hexanediamine, terephthalic acid, adipic acid and caprolactam.

U.S. Pat. No. 3,839,296 involves very generally systems of xT structure, where an enormous list is given for the diamine x. In the specific examples the only compound cited is always x=1,12-dodecanediamine.

The abstract of JP 2002293926 involves providing a copolyamide in which the diamine (component a) comprises 1,10-diaminodecane and in which, on the other hand, the diacid always comprises terephthalic acid and, if appropriate, comprises further systems, an example being a further aromatic diacid differing from terephthalic acid, or C4-20 diacids. A large list of possible diamines is moreover cited as replacement for 1,10-decanediamine, but no specific indication is given of use of a combination (mixture). The specific examples always use only 1,10-decanediamine. There is a single example (comparative example 3) that uses another diamine, replacing 1,10-decanediamine completely by 1,6-hexanediamine in combination with terephthalic acid and adipic acid.

BRIEF DESCRIPTION OF THE INVENTION

The invention is therefore based inter alia on the object of providing a polyamide molding composition improved over the prior art not only with respect to mechanical properties, including under wet or moist conditions, but also with respect to processing possibilities. A further intention was to provide moldings based on this molding composition, and processes for the preparation of this molding composition.

Accordingly, a polyamide molding composition with the following constitution is presently and specifically proposed:
(A) from 30 to 100% by weight of at least one 10T/6T copolyamide, where this is composed of
  (A1) from 40 to 95 mol % of 10T units, formed from the monomers 1,10-decanediamine and terephthalic acid
  (A2) from 5 to 60 mol % of 6T units, formed from the monomers 1,6-hexanediamine and terephthalic acid
(B) from 0 to 70% by weight of reinforcing materials and/or fillers
(C) from 0 to 50% by weight of additives and/or further polymers
where the entirety of components A to C is 100%.

Up to 30% of the monomers within component (A) can be replaced here, and this means that the above applies firstly with the proviso that in component (A), independently of one another, in (A1) and/or (A2) up to 30 mol %, based on the entirety of the dicarboxylic acids, of the terephthalic acid can have been replaced by other aromatic, aliphatic, or cycloaliphatic dicarboxylic acids having from 6 to 36 carbon atoms.

Secondly, furthermore, the above applies with the proviso that in component (A), independently of one another, in (A1) and/or (A2) up to 30 mol % of 1,10-decanediamine and respectively 1,6-hexanediamine, based on the entirety of the diamines, can have been replaced by other diamines having from 4 to 36 carbon atoms.

Finally, the above moreover applies with the proviso that not more than 30 mol % in component (A), based on the entirety of the monomers, can have been formed via lactams or amino acids.

However, it is preferable that this replacement of the monomers within component (A) in accordance with the above provisos amounts to less than 20%, and preferably less than 10%, and it is particularly preferable to use no such replacement at all. A further proviso that applies overall is therefore that the concentration of the entirety of the monomers which replace terephthalic acid, 1,6-hexanediamine, and 1,10-decanediamine (i.e. the total proportion of other aromatic, aliphatic, or cycloaliphatic dicarboxylic acids having from 6 to 36 carbon atoms, and of other diamines having from 4 to 36 carbon atoms, and of lactams or aminoacids) does not exceed 30 mol %, preferably 20 mol %, in particular 10 mol %, based on the entirety of the monomers used in component A.

It has specifically and unexpectedly been found that precisely the abovementioned ratios of the individual components in the copolyamide lead to particular properties. For example, it has been found that below a concentration of 40 mol % of 10T the melting points of the 10T/6T copolyamides rise rapidly, thus preventing satisfactory processing of said compositions. The proposed constitution leads to excellent mechanical properties even under wet or moist conditions, and unexpectedly high heat deflection temperatures are achieved, particularly when reinforcing fibers are also used.

The prior art does not particularly recommend the specific combination of 1,10-decanediamine and 1,6-hexanediamine, and there is certainly no indication in the prior art of the specific molar ratios which can provide the favorable properties presently found. Still less is known from the prior art about the low water absorption of a PA10T/6T combination, and nor is it known from the prior art that this PA10T/6T combination together with reinforcing fibers has high heat deflection temperatures above 260° C.

The present invention accordingly provides a polyamide molding composition with the following properties:
high heat deflection temperature (melting point above 270° C. or HDT A greater than 260° C. for a PA reinforced with 50% of glass fibers)
good processability (melting point below 320° C.; crystallization behavior)
low water absorption (<5% after 240 h in water at 95° C.)
unaltered mechanical properties after water absorption (e.g. wet tensile modulus of elasticity >100% of dry tensile modulus of elasticity, wet yield strength or wet breaking strength >85% of dry yield strength or dry breaking strength)
good surface quality of glass-fiber-reinforced products
high dimensional stability.

A first preferred embodiment is therefore one wherein the melting point and respectively the temperature of deflection to ISO-R 75, method A (DIN 53 461) of component (A) and/or of the entire polyamide molding composition is above 260° C. or above 270° C., preferably in the range from 270 to 320° C., particularly preferably in the range from 270 to 310° C.

The ratios are moreover preferably adjusted in such a way that the water absorption of component (A) and/or of the entire polyamide molding composition is less than 5% by weight, preferably less than 4% by weight and in particular less than 3.5% by weight, e.g. after 240 h in water at 95° C.

It has moreover been found to be advantageous that the ratio of wet:dry tensile moduli of elasticity is greater than or equal to 0.95, preferably greater than or equal to 1.00, with particular preference greater than or equal to 1.05. It is likewise advantageous that the ratio of wet:dry maximum tensile strengths is greater than or equal to 0.85, preferably greater than 0.90, with particular preference greater than or equal to 0.95. The maximum tensile strength corresponds to the maximum strength in the tensile strain graph determined to ISO 527.

For adequately high molecular weight and high relative viscosity, together with good flowability and high MVR (melt volume flow rate), it has proven advantageous that the monomers used are adequately pure. In particular in the case of the diamine, it is advantageous to establish high purity, and it is therefore preferable that the melting point of the 1,10-decanediamine used is above 63° C. and/or that its total diamine content is above 99%, and/or that its aminonitrile content is below 0.5 percent, and/or that its APHA (American Public Health Association color index) color is below 10 units.

As in particular can be discerned from the graphs given below, it has proven advantageous with regard to ideal adjustment of melting point and respectively with regard to water absorption that, within components (A), the (A1) fractions make up from 40 to 90 mol % and that the (A2) fractions make up from 10 to 60 mol %. Particular preference is given here to the following ratio: (A1) from 40 to 80 mol % and (A2) from 20 to 60 mol %, a particular ratio being the following: (A1) from 40 to 75 mol % and (A2) from 25 to 60 mol %.

As explained above, it is preferable that the 10T/6T copolyamide of component (A) is based in essence exclusively, preferably completely exclusively, on terephthalic acid as dicarboxylic acid, and/or that the 10T/6T copolyamide of component (A) is based in essence exclusively, preferably completely exclusively, on 1,10-decanediamine for (A1) and 1,6-hexanediamine for (A2) as diamine, and/or that component (A) is composed in essence exclusively, preferably completely exclusively, of the constituents (A1) and (A2).

According to another preferred embodiment, component (B) involves at least to some extent glass fibers and/or carbon fibers. Component (C) normally and generally involves additives and/or further polymers, for example selected from the following group: impact modifiers, adhesion promoters, crystallization accelerators or crystallization retarders, flow aids, lubricants, mold-release agents, plasticizers, stabilizers, processing aids, flame-retardant additions, pigments, dyes and markers, antistatic agents, nanoparticles in lamellar form, conductivity additives, such as carbon black, graphite powder, or carbon nanofibrils, residues from polymerization processes, e.g. catalysts, salts and their derivatives, and regulators, such as monoacids or monoamines.

In another embodiment, the inventive molding composition also comprises moreover from 8 to 25% by weight, preferably from 10 to 22% by weight, and in particular from 10 to 18% by weight, of a flame retardant (as one constituent of component (C) or forming said component (C) in its entirety). The flame retardant is preferably halogen-free.

The flame retardant in component (C) or forming component (C) in its entirety preferably encompasses here from 60 to 100% by weight, with preference from 70 to 98% by weight, particularly from 80 to 96% by weight, of a phosphinic salt and/or diphosphinic salt (component (C1)) and from 0 to 40% by weight, preferably from 2 to 30% by weight, in particular from 4 to 20% by weight, of a nitrogen-containing synergist and/or of a nitrogen- and phosphorus-containing flame retardant (component (C2)).

Component (C2) preferably involves melamine or condensates of melamine, e.g. melem, melam, or melon, or reaction products of melamine with polyphosphoric acid, or involves reaction products of condensates of melamine with polyphosphoric acid, or involves a mixture thereof.

Melamine polyphosphate is particularly preferred as component (C2). These flame retardants are known from the prior art. Reference is made in this connection to DE 103 46 3261, and the disclosure of said specification is expressly incorporated herein in this regard.

A phosphinic salt of the general formula (I) and/or formula (II) and/or their polymers is preferred as component (C1)

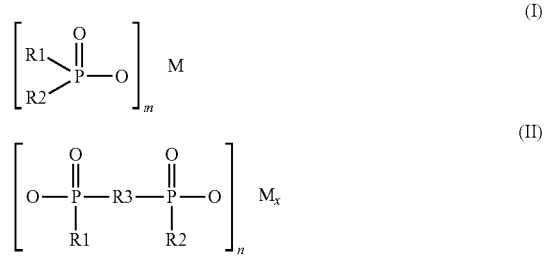

in which
R1 and R2 are identical or different and are preferably C1-C8-alkyl, linear or branched, and/or aryl;
R3 is C1-C10-alkylene, linear or branched, or C6-C10-arylene or -alkylarylene, or arylalkylene;
M is a metal ion from the 2$^{nd}$ or 3$^{rd}$ main or transition group of the Periodic Table of the Elements; and
m is 2 or 3;
n is 1 or 3;
x is 1 or 2.

The metal ion M used preferably comprises Al, Ca, and Zn.

In combination with the flame-retardant components (C1) and (C2), it is also possible, if appropriate, to add from 0.5 to 5% by weight, based on the entirety of (C1) and (C2), of oxygen-, nitrogen-, or sulfur-containing metal compounds, as stabilizers (component (C3)). Metals preferred here are aluminum, calcium, magnesium, and zinc. Suitable compounds are those selected from the group of the oxides, hydroxides, carbonates, silicates, borates, phosphates, and stannates, and combinations and mixtures of said compounds, e.g. oxide hydroxides or oxide hydroxide carbonates. Examples are magnesium oxide, calcium oxide, aluminum oxide, zinc oxide, magnesium hydroxide, aluminum hydroxide, boehmite, dihydrotalcite, hydrocalumite, calcium hydroxide, tin oxide hydrate, zinc hydroxide, zinc borate, zinc sulfide, zinc phosphate, calcium carbonate, calcium phosphate, magnesium carbonate, basic zinc silicate, zinc stannate, calcium stearate, zinc stearate, magnesium stearate, potassium palmitate, magnesium behenate.

Another factor that should therefore be emphasized for the inventive polyamide molding compositions and respectively for the moldings produced therefrom is that excellent flame retardancy is achieved in combination with the exceptional properties described above. The UL classification of the molding composition, for a test specimen of thickness 0.8 mm, is V-0 (UL 94, test to standards from Underwriters Laboratories (U.L.), cf. www.ulstandards.com).

The invention further provides a short-fiber-reinforced pelletized material, a long-fiber-reinforced elongate pelletized material, or a semifinished product, or a molding, composed of a polyamide molding composition as described above, further details of which are also described at a later stage below, particularly preferably for use in a moist and/or wet environment.

The present invention also provides a process for the preparation of a polyamide molding composition as described above and further details of which are also described at a later stage below, where said process preferably comprises adding, to the monomer mixtures, during the preparation of component (A), at least one polycondensation catalyst, preferably in a proportion of from 0.005 to 1.5% by weight, where this can by way of example involve phosphorus compounds, such as phosphoric acid, phosphorous acid, hypophosphorous acid, phenylphosphonic acid, phenylphosphinic acid, and/or salts thereof with cations of valency from 1 to 3, e.g. Na, K, Mg, Ga, Zn, or Al, and/or their esters, such as triphenyl phosphate, triphenyl phosphite, or tris(nonylphenyl) phosphite, or a mixture thereof.

With regard to the dicarboxylic acids which, if appropriate, replace the terephthalic acid, the following applies: the inventive semiaromatic PA10T/6T copolyamides (A) contain this, as dicarboxylic acid, in a molar ratio which is in particular from 40 to 95/from 5 to 60, the material being in essence terephthalic acid. Some of the terephthalic acid can have been replaced by a subordinate amount, preferably not more than 30 mol % (based on the entire amount of the dicarboxylic acids) of other aromatic, aliphatic, or cycloaliphatic dicarboxylic acids having from 6 to 36 carbon atoms. Among the suitable aromatic dicarboxylic acids are naphthalenedicarboxylic acid (NDA) and isophthalic acid (IPS). Suitable aliphatic dicarboxylic acids are adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid, and dimer acid. Suitable cycloaliphatic dicarboxylic acids are cis- and/or trans-cyclohexane-1,4-dicarboxylic acid and/or cis- and/or trans-cyclohexane-1,3-dicarboxylic acid (CHDA).

With regard to the diamines which, if appropriate, replace 1,6-hexanediamine and respectively 1,10-decanediamine, the following applies: the inventive, semiaromatic PA10T/6T copolyamides (A) contain in essence a mixture composed of 1,6-hexanediamine and 1,10-decanediamine in a molar ratio of from 5/95 to 60/40. It is also possible that a subordinate amount, which is preferably not more than 30 mol % (based on the entire amount of the diamines) of the diamines has been replaced by other diamines having from 4 to 36 carbon atoms. Examples of linear or branched, aliphatic diamines are 1,4-butanediamine, 1,5-pentanediamine, 2-methyl-1,5-pentanediamine (MPMD), 1,8-octanediamine (OMDA), 1,9-nonanediamine (NMDA), 2-methyl-1,8-octanediamine (MODA), 2,2,4-trimethylhexamethylenediamine (TM-HMD), 2,4,4-trimethylhexamethylenediamine (TMHMD), 5-methyl-1,9-nonanediamine, 1,11-undecanediamine, 2-butyl-2-ethyl-1,5-pentanediamine, 1,12-dodecanediamine, 1,13-tridecanediamine, 1,14-tetradecanediamine, 1,16-hexadecanediamine, and 1,18-octadecanediamine. Examples of cycloaliphatic diamines that can be used are cyclohexanediamine, 1,3-bis(aminomethyl)cyclohexane (BAC), isophoronediamine, norbornanedimethylamine, 4,4'-diaminodicyclohexylmethane (PACM), 2,2-(4,4'-diaminodicyclohexyl)propane (PACP), and 3,3'-dimethyl-4,4'-diaminodicyclohexylmethane (MACM). m-Xylylenediamine (MXDA) may be mentioned as araliphaticdiamine.

With respect to the lactams and amino acids which can also be present, if appropriate, in component (A), the following applies: the inventive, semiaromatic PA10T/6T copolyamides (A) can contain not only 1,6-hexanediamine, 1,10-decanediamine, and terephthalic acid (taking into account the at least optional partial replacements discussed above for these constituents) but also a subordinate amount, which is preferably not more than 30 mol % (based on the entire amount of the monomers) of lactams or amino acids. Examples of suitable compounds are caprolactam (CL), α,ω-aminocaproic acid, α,ω-aminononanoic acid, α,ω-aminoundecanoic acid (AUA), laurolactam (LL), and ω-aminododecanoic acid (ADA).

For higher glass transition temperatures, preference is given to additions of NDA, IPS, CHDA, MPMD, MODA, TMHMD, BAC, PACM, and MACM. NDA, BAC, and PACM are particularly preferred.

For lower glass transition temperatures, preference is given to additions of long-chain monomers, such as dodecanedioic acid, brassylic acid, tetradecanedioic acid, pentadecanedioic acid, hexadecanedioic acid, octadecanedioic acid, dimer acid, 1,12-dodecanediamine, 1,13-tridecanediamine, 1,14-tetradecanediamine, 1,16-hexadecanediamine, and 1,18-octadecanediamine. Dodecanedioic acid and 1,12-dodecanediamine are particularly preferred.

For adequately high molecular weight and high relative viscosity, together with good flowability and high MVR, the monomers used should preferably have adequate purity. In particular in the case of 1,10-decanediamine, it is advantageous that melting point is above 63° C., total diamine content is above 99%, aminonitrile content is below 0.5%, and APHA color is below 10 units.

Polycondensation catalysts that can be added to the monomer mixtures are from 0.005 to 1.5% by weight of phosphorus compounds, such as phosphoric acid phosphorous acid, hypophosphorous acid, phenylphosphonic acid, phenylphosphinic acid, and/or salts thereof with cations of valency from 1 to 3, e.g. Na, K, Mg, Ga, Zn, or Al, and/or their esters, such as triphenyl phosphate, triphenyl phosphite, or tris(nonylphenyl) phosphite. Preference is given to hypophosphorous acid and sodium hydrogen hypophosphite monohydrate in an amount of from 100 to 500 ppm of phosphorus, based on the semiaromatic PA10T/6T copolyamide (A).

Because diamine compounds are more volatile than dicarboxylic acids, diamine loss occurs during the preparation process. Diamine is lost during evaporation of the water, during discharge of the precondensate, and during the post-condensation in the melt or in the solid phase. To compensate the diamine loss, therefore, it is preferable that a diamine excess of from 1 to 8% by weight, based on the entirety of the diamines, is added to the monomer mixture. The diamine excess is also used to regulate the molecular weight and the distribution of the end groups. In the process used according to the examples, a diamine excess of smaller than 3% gives a carboxy end group excess of from 10 to 150 mmol/kg. A diamine excess of more than 3% produces an amino end group excess of from 10 to 150 mmol/kg.

Regulators in the form of monocarboxylic acids or of monoamines can be added to the mixture and/or to the precondensate (prior to post-condensation) in order to regulate the molar mass, the relative viscosity or respectively the flowability or the MVR. Aliphatic, cycloaliphatic, or aromatic monocarboxylic acids or monoamines suitable as regulators are acetic acid, propionic acid, butyric acid, valeric acid, caproic acid, lauric acid, stearic acid, 2-ethylhexanoic acid, cyclohexanoic acid, benzoic acid, butylamine, pentylamine, hexylamine, 2-ethylhexylamine, n-octylamine, n-dodecylamine, n-tetradecylamine, n-hexadecylamine, stearylamine, cyclohexylamine, 3-(cyclohexylamino)propylamine, methylcyclohexylamine, dimethylcyclohexylamine, benzylamine, 2-phenylethylamine, etc. The regulators can be used individually or in combination. It is also possible to use, as regulators, other monofunctional compounds which can react with an amino or acid group, e.g. anhydrides, isocyanates, acyl halides or esters. The usual amount used of the regulators is from 10 to 200 mmol per kg of polymer.

In order to obtain a mixture which is homogeneous and can be stirred even at an early stage, it is advantageous to admix water with the monomer mixture. The amount of water can be from 5 to 50% by weight, based on the entire mixture. The water can be added together with the diamines in the form of aqueous solutions of the diamines, or together with the dicarboxylic acid in the form of an aqueous slurry, or separately. The molecular weight and the bulk density of the precondensate can be controlled via the amount of water and the pressure set (at which the water is evaporated), and the residence time.

The molding compositions can moreover be modified using up to 70% by weight of fillers and reinforcing materials (glass fibers and/or carbon fibers (including graphite fibers)). Short fibers (e.g. chopped glass whose length is from 2 to 50 mm) or continuous-filament fibers (rovings) can be used for reinforcement.

The glass fibers preferably used here have non-circular cross section and have a main cross-sectional axis: secondary cross-sectional axis dimensional ratio of more than 2, preferably from 2 to 8, in particular from 2 to 5. These glass fibers are known as flat glass fibers and have an oval or elliptical cross section, or elliptical cross section with narrowed portion(s) (these being known as cocoon fibers), or have a polygonal, rectangular, or almost rectangular cross section. The glass fibers themselves here can have been selected from the group of E glass fibers, A glass fibers, C glass fibers, D glass fibers, M glass fibers, S glass fibers, and/or R glass fibers, preference being given here to E glass fibers. The glass fibers per se can also have been provided with an aminosilane coating or an epoxysilane coating, and this therefore applies to flat and also to round or angular fibers whose main cross-sectional axis: secondary cross-sectional axis dimensional ratio is less than 2.

The inventive flat glass fibers with non-circular cross section are preferably used in the form of short glass fibers (chopped glass whose length is from 0.2 to 20 mm, preferably from 2 to 12 mm).

A further characterizing feature of the flat glass fibers used is that the length of the main cross-sectional axis is preferably in the range from 6 to 40 µm, in particular in the range from 15 to 30 µm, and the length of the secondary cross-sectional axis is in the range from 3 to 20 µm, in particular in the range from 4 to 10 µm.

Mixtures of glass fibers with circular and non-circular cross section can also be used for reinforcement of the inventive molding compositions, and the proportion of flat glass fibers as defined above here is preferably predominant, i.e. amounts to more than 50% by weight of the total weight of the fibers. Combinations of the glass fibers (glass fibers whose cross section is circular and/or non-circular) with carbon fibers and/or with synthetic fibers, e.g. aramid fibers, and/or basalt fibers, can also be used as reinforcement.

If reinforced molding compositions with good flowability and good surface quality are desired, in particular in combination with flame retardants, the reinforcing fibers are then preferably mainly (i.e. by way of example to an extent of more than 80% by weight or indeed more than 90% by weight) composed of flat glass fibers or indeed exclusively composed of flat glass fibers.

The diameter of the glass fibers used according to the invention as rovings (filler component B) is from 10 to 20 µm, preferably from 12 to 18 µm, where the cross section of the glass fibers can be round, oval, elliptical, elliptical with narrowed portion(s), polygonal, rectangular, or almost rectangular. Particular preference is given to fibers known as flat glass fibers whose ratio of cross-sectional axes is from 2 to 5. E glass fibers are particularly used according to the invention. However, it is also possible to use any of the other types of glass fiber, e.g. A, C, D, M, S, or R glass fibers, or any desired mixture thereof, or a mixture with E glass fibers.

In the case of long-fiber-reinforced molding compositions, higher toughness values, and properties even more similar to those of metals, are obtained if, instead of the usual continuous-filament glass fibers whose diameter is from 15 to 19 µm, these fibers are used with diameter of from 10 to 14 µm, in particular with diameter of from 10 to 12 µm.

The inventive polyamide molding compositions can be prepared via the known processes for the production of long-fiber-reinforced elongate pelletized material, in particular via pultrusion processes, in which the continuous-filament fiber strand (roving) is completely saturated with the polymer melt and then cooled and chopped.

The long-fiber-reinforced elongate pelletized material thus obtained, the pellet length of which is preferably from 3 to 25 mm, in particular from 4 to 12 mm, can be further processed using the usual processing methods (e.g. injection molding, compression molding) to give moldings, and particularly good properties of the molding are achieved here, using non-aggressive processing methods. Non-aggressive in this context means especially substantial avoidance of excessive fiber breakage and of the attendant marked reduction of fiber length. In the case of injection molding, this means that it is preferable to use screws with large diameter and low compression ratio, in particular smaller than 2, and generously dimensioned nozzle channels and feed channels. A complementary factor to which attention should be paid is that high cylinder temperatures rapidly melt the elongate pelletized material (contact heating) and that the fibers are not excessively comminuted through excessive exposure to shear. According to the invention when these measures are taken into account, moldings are obtained whose average fiber length is higher than that of comparable moldings produced from short-fiber-reinforced molding compositions. The result of this is an additional improvement in properties, in particular in the case of tensile modulus of elasticity, ultimate tensile strength, and notched impact resistance.

The diameter of the continuous-filament carbon fibers used during the pultrusion process is from 5 to 10 µm, preferably from 6 to 8 µm. The continuous-filament carbon fibers can be used alone or in combination with continuous-filament glass fibers (circular and/or non-circular cross section).

To accelerate fiber impregnation, the fibers can be preheated to temperatures up to 400° C. with the aid of a suitable IR, contact, radiative, or hot-gas pre-heating system. Apparatuses using spreader surfaces within the impregnation chamber provide complete impregnation of the fibers with the polymer melt. Strands emerging from the impregnation unit can be molded via controlled roll systems, thus giving pelletized material with circular, elliptical, or rectangular cross section.

To improve binding to the matrix and to improve fiber handling, the fibers may have been coated with sizes of different chemical nature, these being known in the prior art for glass fibers and for carbon fibers.

The thermoplastic molding compositions can preferably comprise, as further component, a particulate filler, or a mixture composed of two or more different fillers, also in combination with reinforcing materials. By way of example, it is possible to use mineral particulate fillers based on talc, on mica, on silicate, on quartz, on titanium dioxide, on wollastonite, on kaolin, on amorphous silicas, on magnesium carbonate, on magnesium hydroxide, on chalk, on lime, on feldspar, on barium sulfate, on solid glass beads, on hollow glass beads, or on ground glass, or to use permanently magnetic or respectively magnetizable metal compounds, and/or alloys. The fillers can also have been surface-treated.

The molding compositions can comprise stabilizers, processing aids, and impact modifiers, and further additives.

In another embodiment, the inventive molding composition comprises up to 45% by weight of one or more impact modifiers (IM). An IM concentration in the range from 5 to 30% by weight is preferred.

The impact modifier, which can be used as a constituent of component C, can be a natural rubber, polybutadiene, polyisoprene, polyisobutylene, a copolymer of butadiene and/or isoprene with styrene or with styrene derivatives and with other comonomers, a hydrogenated copolymer, and/or a copolymer produced via grafting or copolymerization with anhydrides, (meth)acrylic acid, or an ester thereof. The impact modifier (C) can also be a graft rubber with a crosslinked elastomeric core which is composed of butadiene, of isoprene, or of alkyl acrylates, and which has a graft shell composed of polystyrene, or can be a non-polar or polar olefin homo- or copolymer, such as ethylene-propylene rubber, ethylene-propylene-diene rubber, or ethylene-octene rubber, or ethylene-vinyl acetate rubber, or a non-polar or polar olefin homo- or copolymer produced via grafting or copolymerization with anhydrides, (meth)acrylic acid, or an ester thereof. The impact modifier (C) can also be a carboxylic-acid-functionalized copolymer, such as poly(ethene-co-(meth)acrylic acid) or poly(ethene-co-1-olefin-co-(meth) acrylic acid), where the 1-olefin is an alkene or an unsaturated (meth)acrylic ester having more than 4 atoms, inclusive of those copolymers in which the acid groups have been neutralized to some extent with metal ions.

Preferred IMs based on styrene monomers (styrene and styrene derivatives) and on other vinylaromatic monomers are block copolymers composed of alkenylaromatic compounds and of a conjugated diene, and hydrogenated block copolymers composed of an alkenylaromatic compound and of conjugated dienes, and combinations of these types of IM. The block copolymer contains at least one block derived from an alkenylaromatic compound (A) and at least one block derived from a conjugated diene (B). In the case of the hydrogenated block copolymers, the proportion of aliphatically unsaturated carbon-carbon double bonds has been reduced via hydrogenation. Suitable block copolymers are two-, three-, four-, and polyblock copolymers with linear structure. However, branched and star-shaped structures can likewise be used according to the invention. Branched block copolymers are obtained in a known manner, e.g. via graft reactions of polymeric "side branches" onto a main polymer chain.

Other alkenylaromatic monomers that can be used alongside styrene or in a mixture with styrene are vinylaromatic monomers having substitution on the aromatic ring and/or on the C=C double bond by C1-20-hydrocarbon radicals or by halogen atoms.

Examples of alkenylaromatic monomers are styrene, p-methylstyrene, α-methylstyrene, ethylstyrene, tert-butylstyrene, vinyltoluene, 1,2-diphenylethylene, 1,1-diphenylethylene, vinylxylenes, vinyltoluenes, vinylnaphthalenes, divinylbenzenes, bromostyrenes, and chlorostyrenes, and combinations thereof. Preference is given to styrene, p-methylstyrene, alpha-methylstyrene, and vinylnaphthalene.

It is preferable to use styrene, α-methylstyrene, p-methylstyrene, ethylstyrene, tert-butylstyrene, vinyltoluene, 1,2-diphenylethylene, 1,1-diphenylethylene, or a mixture of these. It is particularly preferable to use styrene. However, it is also possible to use alkenylnaphthalenes.

Examples of diene monomers that can be used are 1,3-butadiene, 2-methyl-1,3-butadiene, 2,3-dimethyl-1,3-butadiene, 1,3-pentadiene, 1,3-hexadiene, isoprene, chloroprene, and piperylene. Preference is given to 1,3-butadiene and isoprene, particularly 1,3-butadiene (hereinafter referred to by the abbreviated term butadiene).

The alkenylaromatic monomer used preferably comprises styrene, and the diene monomer used preferably comprises butadiene, and this means that preference is given to styrene-butadiene block copolymer. The block copolymers are generally prepared via anionic polymerization in a manner known per se.

Other further comonomers can also be used concomitantly, in addition to the styrene monomers and diene monomers. The proportion of the comonomers is preferably from 0 to 50% by weight, particularly preferably from 0 to 30% by weight, and in particular from 0 to 15% by weight, based on the total amount of the monomers used. Examples of suitable comonomers are acrylates, in particular C1-12-alkyl acrylates, such as n-butyl acrylate or 2-ethylhexyl acrylate, and the corresponding methacrylates, in particular C1-12-alkyl methacrylates, such as methyl methacrylate (MMA). Other possible comonomers are (meth)acrylonitrile, glycidyl (meth)acrylate, vinyl methyl ether, diallyl and divinyl ethers of dihydric alcohols, divinylbenzene, and vinyl acetate.

In addition to the conjugated diene, the hydrogenated block copolymers also contain, if appropriate, fractions of lower hydrocarbons, e.g. ethylene, propylene, 1-butene, dicyclopentadiene, or non-conjugated dienes. The proportion of the non-reduced aliphatic unsaturated bonds which result from the block B is smaller than 50% in the hydrogenated block copolymers, preferably smaller than 25%, in particular smaller than 10%. The aromatic fractions derived from block A are reduced to an extent of at most 25%. The hydrogenated block copolymers, styrene-(ethylene-butylene) two-block and styrene-(ethylene-butylene)-styrene three-block copolymers are obtained via hydrogenation of styrene-butadiene copolymers and of styrene-butadiene-styrene copolymers.

The block copolymers are preferably composed of from 20 to 90% by weight of block A, in particular from 50 to 85% by weight of block A. The diene can be incorporated in 1,2-orientation or in 1,4-orientation into the block B.

The molar mass of the block copolymers is from 5000 to 500 000 g/mol, preferably from 20 000 to 300 000 g/mol, in particular from 40 000 to 200 000 g/mol.

Suitable hydrogenated block copolymers are the commercially available products, such as KRATON® (Kraton Polymers) G1650, G1651 and G1652, and TUFTEC® (Asahi Chemicals) H1041, H1043, H1052, H1062, H1141, and H1272.

Examples of non-hydrogenated block copolymers are polystyrene-polybutadiene, polystyrene-poly(ethylene-propylene), polystyrene-polyisoprene, poly(α-methylstyrene)-polybutadiene, polystyrene-polybutadiene-polystyrene (SBS), polystyrene-poly(ethylene-propylene)-polystyrene, polystyrene-polyisoprene-polystyrene, and poly(α-methylstyrene)-polybutadiene-poly(α-methylstyrene), and combinations thereof.

Suitable non-hydrogenated block copolymers which are commercially available are various products with the trademarks SOLPRENE® (Phillips), KRATON® (Shell), VECTOR® (Dexco), and SEPTON® (Kuraray).

According to another preferred embodiment, the inventive molding compositions are those wherein component C comprises a polyolefin homopolymer or an ethylene-α-olefin copolymer, particularly preferably an EP elastomer and/or EPDM elastomer (ethylene-propylene rubber and respectively ethylene-propylene-diene rubber). By way of example, an elastomer can be involved which is based on an ethylene-C3-12-α-olefin copolymer with from 20 to 96% by weight, preferably from 25 to 85% by weight, of ethylene, where it is particularly preferable here that the C3-12-α-olefin involves an olefin selected from the group of propene, 1-butene, 1-pentene, 1-hexene, 1-octene, 1-decene, and/or 1-dodecene, and it is particularly preferable that component C involves ethylene-propylene rubber and/or LLDPE, and/or VLDPE.

Alternatively or additionally (by way of example in a mixture), C can comprise a terpolymer based on ethylene-C3-12-α-olefin with an unconjugated diene, and it is preferable here that this contains from 25 to 85% by weight of ethylene and up to at most amounts in the region of 10% by weight of an unconjugated diene, and it is particularly preferable here that the C3-12-α-olefin involves an olefin selected from the group of propene, 1-butene, 1-pentene, 1-hexene, 1-octene, 1-decene, and/or 1-dodecene, and/or where the unconjugated diene has preferably been selected from the group of bicyclo [2.2.1]heptadiene, 1,4-hexadiene, dicyclopentadiene, and/or in particular 5-ethylidenenorbornene.

Ethylene-acrylate copolymers can also be used as constituent for component C.

Other possible forms of constituents for component C are the ethylene-butylene copolymers and respectively mixtures (blends) which comprise these systems.

It is preferable that component C comprises constituents having anhydride groups, these being introduced via thermal or free-radical reaction of the main-chain polymer with an unsaturated dicarboxylic anhydride, with an unsaturated dicarboxylic acid, or with a monoalkyl ester of an unsaturated dicarboxylic acid, at a concentration sufficient for good binding to the polyamide, and it is preferable here to use reagents selected from the following group:

maleic acid, maleic anhydride, monobutyl maleate, fumaric acid, aconitic acid, and/or itaconic anhydride. It is preferable that from 0.1 to 4.0% by weight of an unsaturated anhydride are grafted onto the impact-resistant component as a constituent of C, or that the unsaturated dicarboxylic anhydride or its precursor is applied by grafting together with another unsaturated monomer. It is generally preferable that the degree of grafting is in the range from 0.1 to 1.0%, particularly preferably in the range from 0.3 to 0.7%. Another possible constituent of component C is a mixture composed of an ethylene-propylene copolymer and of an ethylene-butylene copolymer, the degree of maleic anhydride grafting (degree of MA grafting) here being in the range from 0.3 to 0.7%.

The possible systems cited above for this component can also be used in mixtures.

Component C can moreover comprise components which have functional groups, e.g. carboxylic acid groups, ester groups, epoxy groups, oxazoline groups, carbodiimide groups, isocyanate groups, silanol groups, and carboxylate groups, or can comprise a combination of two or more of the functional groups mentioned. Monomers which bear said functional groups can be bonded via copolymerization or grafting to the elastomeric polyolefin.

The IMs based on the olefin polymers can moreover also have been modified via grafting with an unsaturated silane compound, e.g. vinyltrimethoxysilane, vinyltriethoxysilane, vinyltriacetosilane, methacryloxypropyltrimethoxysilane, or propenyltrimethoxysilane.

The elastomeric polyolefins are random, alternating, or segmented copolymers having linear, branched, or core-shell structure, and contain functional groups which can react with the end groups of the polyamides, thus giving adequate compatibility between polyamide and IM.

The inventive IMs therefore include homopolymers or copolymers of olefins, e.g. ethylene, propylene, 1-butene, or copolymers of olefins and of copolymerizable monomers, such as vinyl acetate, (meth)acrylic ester, and methylhexadiene.

Examples of crystalline olefin polymers are low-, medium-, and high-density polyethylenes, polypropylene, polybutadiene, poly-4-methylpentene, ethylene-propylene block copolymers or ethylene-propylene random copolymers, ethylene-methylhexadiene copolymers, propylene-methylhexadiene copolymers, ethylene-propylene-butene copolymers, ethylene-propylene-hexene copolymers, ethylene-propylene-methylhexadiene copolymers, poly(ethylene-vinyl acetate) (EVA), poly(ethylene-ethyl acrylate) (EEA), ethylene-octene copolymer, ethylene-butene copolymer, ethylene-hexene copolymer, ethylene-propylene-diene terpolymers, and combinations of the polymers mentioned.

Examples of commercially available impact modifiers which can be used for the purposes of the constituents of component C are:
TAFMER MC201: g-MA (~0.6%) blend from 67% EP copolymer (20 mol % propylene)+33% EB copolymer (15 mol % 1-butene)): Mitsui Chemicals, Japan.
TAFMER MH5010: g-MA (~0.6%) ethylene-butylene copolymer; Mitsui.
TAFMER MH7010: g-MA (~0.7%) ethylene-butylene copolymer; Mitsui.
TAFMER MH7020: g-MA (~0.7%) EP copolymer; Mitsui.
EXXELOR VA1801: g-MA (~0.7%) EP copolymer; Exxon Mobile Chemicals, US.
EXXELOR VA1803: g-MA (0.5-0.9%) EP copolymer, amorphous, Exxon.
EXXELOR VA1810: g-MA (~0.5%) EP copolymer, Exxon.
EXXELOR MDEX 94-1 1: g-MA (0.7%) EPDM, Exxon.
FUSABOND MN493D: g-MA (~0.5%) ethylene-octene copolymer, DuPont, US.
FUSABOND A EB560D: (g-MA) ethylene-n-butyl acrylate copolymer, DuPont.
ELVALOY, DuPont.

Preference is also given to an ionomer in which the polymer-bonded carboxy groups have been bonded to one another entirely or to some extent via metal ions.

Particular preference is given to maleic-anhydride-grafting-functionalized copolymers of butadiene with styrene, to non-polar or polar olefin homo- and copolymers produced via grafting with maleic anhydride, and to carboxylic-acid-functionalized copolymers, such as poly(ethene-co-(meth)acrylic acid) or poly(ethene-co-1-olefin-co-(meth)acrylic acid), in which the acid groups have to some extent been neutralized with metal ions.

The inventive PA10T/6T polyamides can be mixed with polyphenylene ethers (PPE). The polyphenylene ethers are known per se. They are prepared (cf. U.S. Pat. Nos. 3,661,848, 3,378,505, 3,306,874, 3,306,875 and 3,639,656) by conventional processes via oxidative coupling, from phenols disubstituted by alkyl groups in the ortho position. The preparation process usually uses catalyst based on heavy metals, such as copper, manganese, or cobalt, in combination with other substances, such as secondary amines, tertiary amines, halogens, or a combination thereof. Mixtures of polyamides with polyphenylene ethers are also known per se, but not with the copolyamide component proposed. By way of example WO-A-2005/0170039, WO-A-2005/0170040, WO-A-2005/0170041, and WO-A-2005/0170042 disclose mixtures composed of polyamide and PPE.

Suitable polyphenylene ethers are poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, or copolymers such as those which contain 2,3,6-trimethylphenol, and also polymer mixtures. Preference is given to poly(2,6-dimethyl-1,4-phenylene) ether optionally in combination with 2,3,6-trimethylphenol units. The polyphenylene ethers can be used in the form of homopolymers, copolymer, graft copolymers, block copolymer, or ionomers.

The intrinsic viscosity of suitable polyphenylene ethers is generally in the range from 0.1 to 0.6 dl/g, measured in $CHCl_3$ at 25° C. This corresponds to a molecular weight Mn (number average) of from 3000 to 40 000 and to a weight-average molecular weight value Mw of from 5000 to 80 000. It is possible to use a combination of a high-viscosity polyphenylene ether and a low-viscosity polyphenylene ether. The ratio of the two polyphenylene ethers of different viscosity depends on the viscosities and on the physical properties desired.

The blends of the inventive PA10T/6T can comprise from 10 to 45% by weight of polyphenylene ether and optionally up to 30% by weight, preferably up to 15% by weight, of impact modifier. For better compatibility, compatibilizers are used in the form of polyfunctional compounds which interact with the polyphenylene ether, the polyamide, or both. The interaction can be chemical (e.g. via grafting) and/or physical (e.g. via influence on the surface properties of the disperse phase).

The compatibilizers can be polyfunctional compounds which contain at least one carboxylic acid group, carboxylic anhydride group, ester group, amide group, or imide group. Mention may be made by way of example of maleic acid, maleic anhydride, fumaric acid, acrylic acid, methacrylic acid, methylmaleic acid, methylmaleic anhydride, itaconic acid, itaconic anhydride, butenylsuccinic acid, butenylsuccinic anhydride, tetrahydrophthalic acid, tetrahydrophthalic anhydride, N-phenylmaleimide, citric acid, malic acid, and 2-hydroxynonadecane-1,2,3-tricarboxylic acid, the mono- or diesters of the acids mentioned with C1-C12 alcohols, such as methanol or ethanol, the mono- or diamides of the acids mentioned which, if appropriate, can have substitution on the nitrogen by alkyl or aryl radicals having up to 12 carbon atoms, and the salts with alkali metals or with alkaline earth metals, e.g. calcium and potassium. Particularly advantageous compounds are maleic acid, fumaric acid, maleic anhydride, and citric acid. An amount of from 0.05 to 2% by weight of the compatibilizers can be added directly during blend preparation, or the polyphenylene ether and/or the polyamide is functionalized in a separate step via the compatibilizers.

The invention further provides for the use of the inventive molding compositions for the production of thermoplastically processable molded items, and also the molded items obtainable from the inventive compositions.

Examples of these molded items include: casings and functional parts for pumps, gearboxes, valves and water meters, throttle valves, cylinders, pistons, headlamp casings, reflectors, bend-adaptive lighting, gearwheels, engine mountings and gearbox mountings, connectors, including plug connectors, profiles, foils, or layers of multilayer foils; they also include fibers, electronic components, casings for electronic components, tools, composite materials, fluid-conducting lines and containers, in particular in the automobile sector, smooth and corrugated mono- or multilayer tubes, tube sections, spigots, fittings for the connection of hoses, of corrugated tubes, and of lines conducting fluids, a constituent of multilayer lines (inner, outer, or intermediate layer), individual layers in multilayer containers, hydraulic lines, brake lines, clutch lines, coolant lines, brake-fluid containers, etc.

The molded items can be produced by the processes of injection molding, extrusion, or blow molding.

The present invention further provides a powder based on the PA10T/6T copolyamides, a layer-by-layer process in which regions of the respective pulverulent layer are melted selectively, and are hardened after cooling, and also moldings produced from said powder.

It is preferable here to use powders whose average grain size is from 30 to 200 μm, in particular from 50 to 150 μm, an example being those obtained via grinding processes and precipitation processes. Preferred processes here are particularly those which lead to particles whose shape is as close as possible to spherical, since these exhibit advantages during application of powder in layers in the selective laser sintering process (SLS process).

It is preferable to use unregulated or regulated copolyamide powders whose solution viscosity (0.5% by weight in m-cresol at 20° C.) is in the range from 1.3 to 2.0, in particular in the range from 1.35 to 1.85. Mono- and/or dicarboxylic acids, or mono- and/or diamines, are used for regulation. The ratio of carboxy to amino end groups in the regulated copolyamide powders is preferably greater than or equal to 1:2 and, respectively, 2:1, in particular greater than or equal to 1:3 and, respectively, 3:1, where the concentration of the predominant carboxy or amino end groups is at least 50 mmol/kg, in particular at least 100 mmol/kg.

One preferred embodiment of the sintering powder is a mixture of oppositely difunctionally regulated PA10T/6T. This means that the powders are composed of a combination of separately amine-regulated and carboxy-regulated powder particles. This mixed copolyamide powder retains its solution viscosity at an almost constant level on exposure to thermal stress below the melting point, for example the stress occurring during the SLS process for the non-sintered powder, and said mixed powder can therefore be used repeatedly in the rapid prototyping/rapid manufacturing process with only small amounts of virgin powder or indeed without addition of virgin powder. Disposal of powder residue often becomes unnecessary by virtue of these excellent recycling qualities.

One process which has particularly good suitability for the purposes of rapid prototyping or rapid manufacturing is laser sintering. In this process, plastics powders are selectively and briefly irradiated with a laser beam in a chamber, thus melting the powder particles impacted by the laser beam. The molten particles coalesce and, after cooling, solidify again to give a solid mass. This process can produce complex three-dimensional bodies simply and rapidly, via repeated irradiation of a succession of newly applied layers. However, there are a number of other suitable processes, as well as laser sintering. The selectivity of the layer-by-layer processes here can be achieved by way of application of susceptors, absorber, inhibitors, or masks, or by way of focused introduction of energy, for example via a laser beam or via a glass fiber cable.

Polyamide-12 powder has proven particularly successful in industry for laser sintering for the production of components. Although the parts manufactured from PA12 powder are often adequate for mechanical stresses and their properties are therefore close to those of the subsequent mass-produced injection-molded or extruded parts, PA12 has a low melting point of 178° C. and low stiffness of about 1300 MPa, which is inadequate for many applications. These disadvantages can be overcome via the inventive copolyamide powders based on PA10T/6T whose melting point is in the range from 270 to 320° C. and whose tensile modulus of elasticity is above 2500 MPa.

The sintering powder can comprise at least one further filler, as well as the 10T/6T copolyamide particles. These fillers can by way of example be glass particles or metal particles, or ceramic particles, or else the abovementioned particulate fillers. In particular, the sintering powder can comprise solid or hollow glass beads, steel shot, or granular metal as fillers. Glass beads whose average diameter is from 20 to 80 μm are typically used. In one preferred embodiment, these fillers have been coated with a thin layer of the inventive copolyamide, the layer thickness here preferably being from 2 to 30 μm, in particular from 5 to 20 μm. The average particle size of the filler particles here is preferably smaller than or approximately equal to that of the particles of the polyamides. The amount by which the average particle size of the fillers exceeds the average particle size of the polyamides should preferably be not more than 30%, preferably not more than 20%, and very particularly preferably not more than 10%. There is a particular limitation on particle size via the permissible layer thickness in the respective laser sintering apparatus.

The inventive copolyamide molding compositions can also be spun to give fibers which are resistant to temperature change and which have high strength and low water absorption. Together with other polymers, it is possible to produce the fibers known as bicomponent fibers, of side-by-side type and of core-shell type.

BRIEF EXPLANATION OF THE FIGURES

The invention will be explained in more detail below using inventive examples in conjunction with the figures.

METHODS OF WORKING THE INVENTION

Figure 1:
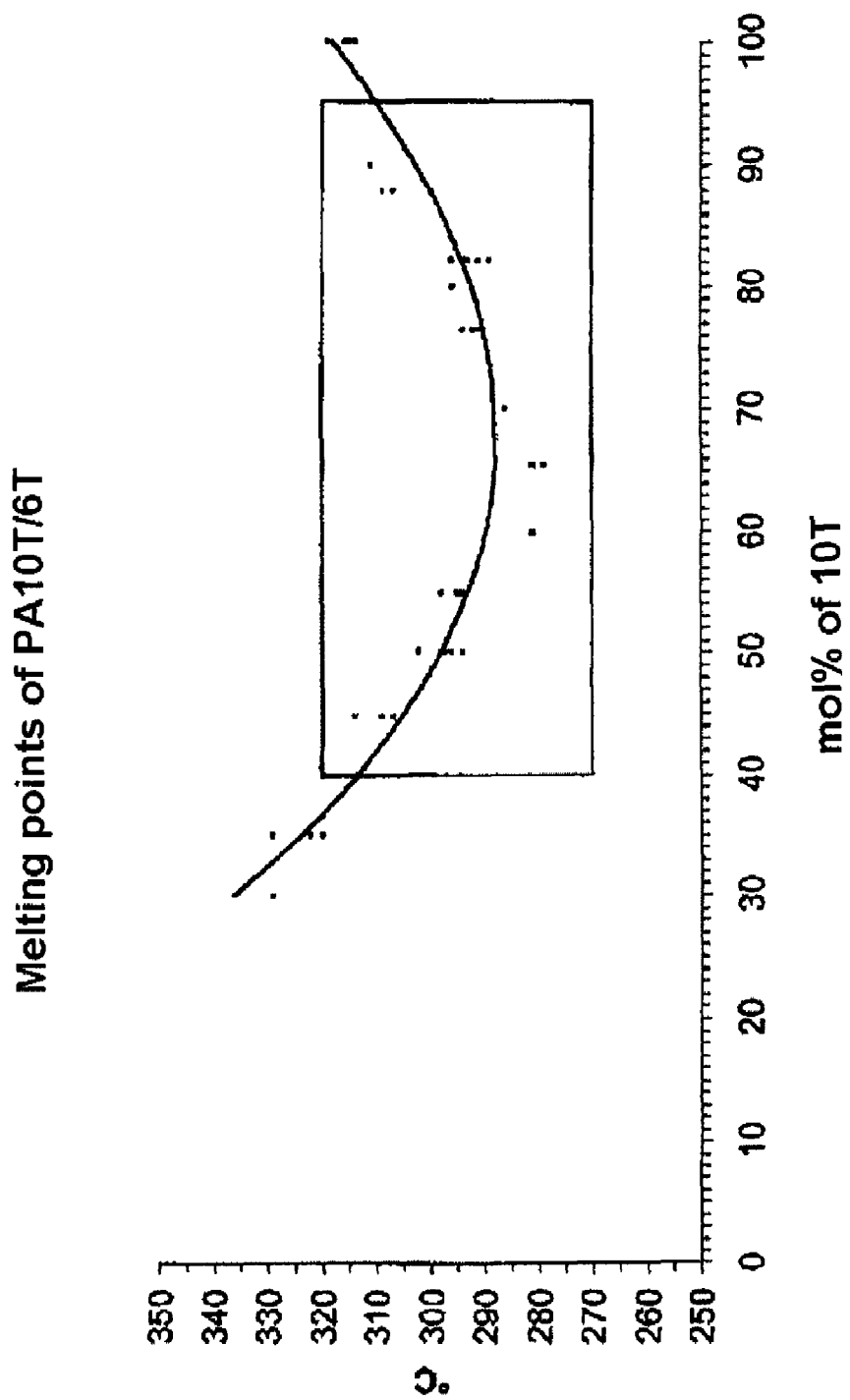
FIG. 1 shows the melting points of PA 10T/6T.

Production of the Products/Preparation Processes:

The semiaromatic PA 10T/6T copolyamides (A) can be prepared by processes known per se. Suitable processes have been described in various publications, and some of the possible processes discussed in the patent literature will be cited below, and the disclosure of the documents discussed hereinafter is expressly incorporated by way of reference into the disclosure of this document with regard to the process for the preparation of the copolyamide of component (A) of the present invention:

DE 195 13 940 describes a process which encompasses the following stages, and this process can be used for the preparation of component (A):

a) a salt-formation stage for the formation of salts composed of diamine(s) and dicarboxylic acid(s) in an aqueous solution of strength from 5 to 50% by weight comprising the components, and, if appropriate, partial prereaction to give low-molecular-weight oligoamides at temperatures of from 120° C. to 220° C. and under pressures of up to 23 bar, b) if appropriate, transfer of the solution from stage a) into a second reaction vessel or into a stirred autoclave, under the conditions prevailing at the end of its preparation process, c) conduct of the reaction phase during which the reaction takes place to give the precondensates, with heating of the reactor contents to a prescribed temperature and controlled adjustment of the partial water vapor pressure to the prescribed value, which is maintained via controlled discharge of water vapor or, if appropriate, controlled infeed of water vapor from a steam generator associated with the autoclave, d) a stationary-state phase to be maintained for at least 10 minutes, in which the temperature of the reactor contents and the partial water vapor pressure are respectively adjusted in a controlled manner—using the measures listed under c) in the case of the partial water vapor pressure—to the values intended for the transfer of the precondensates to the following stage of the process, the above with the proviso that in the case of precondensates of semicrystalline polyamides or copolyamides whose melting point is more than 280° C. (melting point maximum measured by means of differential scanning calorimetry) the temperature of the reactor contents during this phase d) and phase c) is not permitted to exceed 265° C., and that, for said semicrystalline polyamides or copolyamides, during phases d) and c), the boundary conditions described are to be maintained with respect to the dependency of the minimum partial water vapor pressure to be used on the temperature of the reactor contents and on the amide group concentration of the polymer, e) a discharge phase, during which the precondensates can be introduced into a final reaction apparatus, while the temperature prevailing at the end of phase d) is kept constant, and the partial water vapor pressure prevailing at said juncture is at least maintained, via infeed of water vapor from said steam generator into the autoclave, and all discharge lines/assemblies associated therewith, either in the molten state by way of a buffer device directly or by way of a separator apparatus and passage through the solid state, with subsequent optional drying and/or comminution and, if appropriate, further stages of the process.

EP 0 976 774 describes a process for the preparation of polyamides which encompasses the following steps in the stated sequence and which likewise can be used for the preparation of the copolyamide of component (A), if the corresponding constituents are replaced according to the invention:

(i) a step in which a dicarboxylic acid component with terephthalic acid content and a diamine component are polycondensed in the presence of from 15 to 35% by weight of water at a reaction temperature of from 250° C. to 280° C. and at a reaction pressure (P) which complies with the following formula $P_0 \geq P \geq 0.7 P_0$, where $P_0$ is the saturated vapor pressure of water at the reaction temperature, in order to form a primary polycondensate;

(ii) a step in which the resultant polycondensate formed as in the preceding step (i) is taken from the reactor into an atmospheric environment while its temperature is in the range from 250° C. to 280° C. and its water content is in the range from 15 to 35% by weight;

(iii) a step in which the primary polycondensate thus taken from the preceding step (ii) is subjected to solid-phase polymerization or polymerization in the melt, in order to give a polyamide with an increased molecular weight.

EP 0 129 195, EP 0 129 196, and EP 0 299 444 describe processes for the continuous preparation of polyamides which are also suitable in appropriately modified form for the production of component (A), by first heating aqueous solutions of strength from 30 to 70% of salts composed of dicarboxylic acids and of diamines under elevated pressure of from 1 to 10 bar, with simultaneous evaporation of water, within a residence time of less than 60 seconds, to a temperature of from 250 to 300° C., and then continuously separating prepolymers and vapors, rectifying the vapors, and returning the entrained diamines. Finally, the prepolymer is passed to a polycondensation zone and polycondensed at a gage pressure of from 1 to 10 bar and at a temperature of from 250 to 300° C. On exit from the evaporator zone, the degree of conversion is advantageously at least 93% and the water content of the prepolymer is at most 7% by weight. Formation of diamines is substantially avoided by these short residence times.

U.S. Pat. No. 4,831,108 describes a polycondensation process for the preparation of polyamides, polyamideimides, polyesters, and polyarylates, which likewise can be used in appropriately modified form for the preparation of component (A), and which is characterized in that a heated solution of a salt or of a prepolymer, or of a mixture composed of a salt and of a prepolymer, is first formed, and practically is homogeneous, and forms a single phase, and is stable at the selected polycondensation temperature, and readily atomizes, and then this solution is fed, with formation of an aerosol, into a vaporization reactor, which is operated at a pressure of from about 0 to 2.76 MPa (from 0 to 400 psig), for purposes of condensation and polymerization, where said vaporization reactor has been designed for high heat flux with wall temperatures of from about 204 to 538° C. (from 400 to 1000° F.) and melting points of from about 177 to 399° C. (from 350 to 750° F.), and where the resultant polymer is kept in the reactor for from about 0.1 to about 20 seconds.

U.S. Pat. No. 4,607,073 reveals that semiaromatic polyamides can also be prepared from terephthaloyl chloride or dimethyl terephthalate with the corresponding diamines. Polyamide is prepared via precondensation of the dry salt at 310° C. under nitrogen and at atmospheric pressure and then 12 hours of solid-phase postcondensation at 295° C. This type of process can also be used for preparation of component (A) after appropriate modification.

According to DE 14 95 393 and U.S. Pat. No. 3,454,536, it is preferable, when preparing the polyamides from the dicarboxylic esters, to begin by heating the starting components in the presence of water to from 90° C. to 100° C., and to remove the resultant methanol practically completely by distillation, and then to polycondense the distillation residue either at superatmospheric pressure with subsequent depressurization or at atmospheric pressure throughout, at temperatures of from 250 to 290° C. This type of process can also be used for the preparation of component (A).

The most familiar process for the preparation of polyamides with high melting points, and a suitable process for the preparation of component (A), is the two-stage preparation first of a low-viscosity, low-molecular-weight precondensate, with subsequent post-condensation in the solid phase or in the melt (e.g. in an extruder). A three-stage process is also possible, composed of 1. precondensation, 2. solid-phase polymerization, and 3. polymerization in the melt, as cited in DE 696 30 260.

For products with melting points below 300° C., another suitable process is the single-stage batch process described by way of example in U.S. Pat. Nos. 3,843,611 and 3,839,296, in which the mixture of the monomers or their salts is heated for from −1 to 16 hours to temperatures of from 250 to 320° C., and the pressure is reduced from a maximum to the lowest pressure of up to 1 mmHg, with evaporation of gaseous material, if appropriate with the aid of an inert gas.

Specific examples will be given below, and compared with comparative examples (C) and discussed. Storage in water for determination of the appropriate parameters here took place at 95° C. for a time of 240 hours.

The measurements were conducted to the following standards and on the following test specimens.

Tensile Modulus of Elasticity:
  ISO 527 using a tensile test velocity of 50 mm/min (unreinforced variants) or a tensile test velocity of 5 mm/min (reinforced variants)
  ISO tensile specimen, standard: ISO/CD 3167, A1 type, 170×20/10×4 mm, temperature 23° C.
  Transverse stiffness was determined on a BIAX test specimen (BIAX, published in Noss'Ovra Staff Magazine, December 2006, No. 12, volume 29, EMS-CHEMIE AG), which permits direction-dependent measurement of stiffness and strength.

Maximum Tensile Strength, Ultimate Tensile Strength, and Transverse Strength:
  ISO 527 using a tensile test velocity of 50 mm/min (unreinforced variants) or a tensile test velocity of 5 mm/min (reinforced variants)
  ISO tensile specimen, standard: ISO/CD 3167, A1 type, 170×20/10×4 mm, temperature 23° C.
  Transverse strength (transverse ultimate tensile strength) was determined on a BIAX test specimen (BIAX, published in Noss'Ovra Staff Magazine, December 2006, No. 12, volume 29, EMS-CHEMIE AG), which permits direction-dependent measurement of stiffness and strength.

Thermal Behavior:
  Melting point, enthalpy of fusion, and glass transition temperature (Tg):
  ISO standard 11357-11-2
  Granulated material
  Differential scanning calorimetry (DSC) was carried out using a heating rate of 20° C./min. The onset temperature is stated for the glass transition temperature (Tg).

Relative Viscosity:
  DIN EN ISO 307, in 0.5% strength by weight m-cresol solution, 20° C., granulated material HDT A (1.8 MPa), HDT B (0.45 MPa), and HDT C (8 MPa):
  ISO 75
  ISO impact specimen, 80×10×4

Tube Tests:
  Low-temperature impact, breaking stress, elongation at break:
  VW TL 52435
  The low-temperature impact test was carried out at −40° C. using 500 g, and the longitudinal tensile test was carried out at 23° C. and 50% humidity, using 100 mm/min, on 8×1 mm tubes.

Bursting Pressure
  DIN 73378
  8×1 mm tube

INVENTIVE EXAMPLES 1-7 (IE 1-IE 7) AND COMPARATIVE EXAMPLES 1, 2, 7, AND 8 (CE1, CE2, CE7, AND CE8), PreC

Diamine(s), terephthalic acid, catalyst, regulator, and water are placed in a 20 l autoclave and are heated to the product temperature within the heating time, kept at the prescribed pressure for the pressure phase time, and then discharged by way of a nozzle. The precondensate is dried for 24 hours at 120° C. under a vacuum of 30 mbar.

INVENTIVE EXAMPLES 1-7 (IE 1-IE 7) AND COMPARATIVE EXAMPLES 1-4, 7, AND 8 (CE1-CE4, CE7, AND CE8), PostC The precondensate from example PreC is postcondensed in a twin-screw extruder from Werner and Pfleiderer using a screw diameter of 25 mm with prescribed process parameters (barrel temperature, screw rotation rate, throughput). The melt is devolatilized in zone 10 by a stream of nitrogen.

The product is drawn off in the form of a strand from a die with diameter 3 mm and pelletized. The pellets are dried for 24 hours at 120° C. in a vacuum of 30 mbar.

INVENTIVE EXAMPLES 1-15 (IE 1-IE 15) AND COMPARATIVE EXAMPLES 1-12 (CE1-CE12), IMTS

The postcondensate from inventive example PostC and from the comparative example PostC, or, respectively, the compounded material (IE 11-IE 15, and CE 9-CE 12) is injection-molded in an Arburg Allrounder 320-210-750 injection-molding machine, to give ISO tensile specimens, at defined cylinder temperatures for zones 1 to 4 and at a defined mold temperature.

TABLE 1

Starting weights, process conditions, and properties for inventive examples IE1-IE4
PreC, PostC, and IMTS

|  | mol % | PA10T/6T 44.9/55.1 | PA10T/6T 49.9/50.1 | PA10T/6T 55.0/45.0 | PA10T/6T 65.5/34.5 |
|---|---|---|---|---|---|
| Precondensate (PreC) |  | IE1-PreC | IE2-PreC | IE3-PreC | IE4-PreC |
| 1,6-Hexanediamine | g | 1323 | 1599 | 1061 | 797 |
| 1,10-Decanediamine | g | 1597 | 2359 | 1920 | 2246 |

TABLE 1-continued

Starting weights, process conditions, and properties for inventive examples IE1-IE4 PreC, PostC, and IMTS

|  | | PA10T/6T 44.9/55.1 | PA10T/6T 49.9/50.1 | PA10T/6T 55.0/45.0 | PA10T/6T 65.5/34.5 |
|---|---|---|---|---|---|
| | mol % | | | | |
| Terephthalic acid | g | 3363 | 4428 | 3302 | 3240 |
| Hypophosphorous acid (50% strength) | g | 8 | 11 | 8 | 8 |
| Benzoic acid | g | 32 | | 32 | 32 |
| Water | g | 5175 | 3600 | 5175 | 5175 |
| Heating time | min | 68 | 55 | 65 | 78 |
| Product temperature | ° C. | 260 | 260 | 260 | 260 |
| Pressure phase time | min | 60 | 60 | 60 | 60 |
| Pressure | bar | 32 | 32 | 32 | 32 |

| Postcondensate (PostC) | | IE1-PostC | IE2-PostC | IE3-PostC | IE4-PostC |
|---|---|---|---|---|---|
| Cylinder temperature | ° C. | 330 | 340 | 320 | 320 |
| Screw rotation rate | rpm | 150 | 150 | 150 | 150 |
| Throughput | kg/h | 4 | 5 | 4 | 4 |
| Relative viscosity | | 1.598 | 2.162 | 1.553 | 1.576 |
| COOH | µeq/g | 163 | 182 | 164 | 165 |
| $NH_2$ | µeq/g | 28 | 49 | 37 | 43 |
| Melting point | ° C. | 307 | 295 | 294 | 279 |
| Enthalpy of fusion | J/g | 44 | 37 | 32 | 39 |
| Glass transition temperature | ° C. | 125 | 126 | 124 | 121 |

| Injection-molded test specimens (IMTS) | | IE1-IMTS | IE2-IMTS | IE3-IMTS | IE4-IMTS |
|---|---|---|---|---|---|
| Cylinder temperatures, zone 1 | ° C. | 315 | 315 | 315 | 315 |
| Cylinder temperatures, zone 2 | ° C. | 320 | 320 | 320 | 320 |
| Cylinder temperatures, zone 3 | ° C. | 325 | 325 | 325 | 325 |
| Cylinder temperatures, zone 4 | ° C. | 330 | 335 | 330 | 330 |
| Mold temperature | ° C. | 110 | 90 | 110 | 110 |
| Water absorption | % by wt. | 3.3 | 3.6 | 3.2 | 3.0 |
| Tensile modulus of elasticity, dry | MPa | 2800 | 2700 | 2550 | 2500 |
| Tensile modulus of elasticity, water-saturated | MPa | 3150 | 3000 | 3000 | 2850 |
| Modulus ratio | | 1.13 | 1.11 | 1.18 | 1.14 |
| Maximum tensile strength, dry | MPa | 85 | 106 | 90 | 87 |
| Maximum tensile strength, water-saturated | MPa | 84 | 90 | 80 | 77 |
| Strength ratio | | 0.99 | 0.85 | 0.89 | 0.89 |

TABLE 2

Starting weights, process conditions, and properties for inventive examples IE5-IE7 PreC, PostC, and IMTS

|  | | PA10T/6T 76.5/23.5 | PA10T/6T 82.2/17.8 | PA10T/6T 88.0/12.0 |
|---|---|---|---|---|
| | mol % | | | |
| Precondensate (PreC) | | IE5-PreC | IE6-PreC | IE7-PreC |
| 1,6-Hexanediamine | g | 533 | 536 | 266 |
| 1,10-Decanediamine | g | 2572 | 3670 | 2901 |
| Terephthalic acid | g | 3178 | 4180 | 3115 |
| Hypophosphorous acid (50% strength) | g | 8 | 11 | 8 |
| Benzoic acid | g | 32 | | 32 |
| Water | g | 5175 | 3600 | 5175 |
| Heating time | min | 70 | 52 | 67 |
| Product temperature | ° C. | 260 | 260 | 260 |
| Pressure phase time | min | 60 | 60 | 60 |
| Pressure | bar | 32 | 32 | 32 |
| Postcondensate (PostC) | | IE5-PostC | IE6-PostC | IE7-PostC |
| Cylinder temperature | ° C. | 320 | 330 | 320 |
| Screw rotation rate | rpm | 150 | 150 | 150 |
| Throughput | kg/h | 4 | 5 | 4 |
| Relative viscosity | | 1.637 | 2.148 | — |
| COOH | µeq/g | 214 | 50 | 111 |
| $NH_2$ | µeq/g | 51 | 47 | 43 |
| Melting point | ° C. | 291 | 295 | 307 |
| Enthalpy of fusion | J/g | 38 | 41 | 46 |

TABLE 2-continued

Starting weights, process conditions, and properties for inventive examples IE5-IE7 PreC, PostC, and IMTS

|  | mol % | PA10T/6T 76.5/23.5 | PA10T/6T 82.2/17.8 | PA10T/6T 88.0/12.0 |
|---|---|---|---|---|
| Glass transition temperature | °C. | 124 | 122 | 118 |
| Injection-molded test specimens (IMTS) |  | IE5-IMTS | IE6-IMTS | IE7-IMTS |
| Cylinder temperatures, zone 1 | °C. | 315 | 335 | 315 |
| Cylinder temperatures, zone 2 | °C. | 320 | 340 | 320 |
| Cylinder temperatures, zone 3 | °C. | 325 | 345 | 325 |
| Cylinder temperatures, zone 4 | °C. | 330 | 350 | 330 |
| Mold temperature | °C. | 110 | 90 | 110 |
| Water absorption | % by wt. | 2.8 | 2.8 | 2.4 |
| Tensile modulus of elasticity, dry | MPa | 2600 | 2850 | 2700 |
| Tensile modulus of elasticity, water-saturated | MPa | 2950 | 3100 | 3000 |
| Modulus ratio |  | 1.13 | 1.09 | 1.11 |
| Maximum tensile strength, dry | MPa | 88 | 104 | 89 |
| Maximum tensile strength, water-saturated | MPa | 79 | 97 | 81 |
| Strength ratio |  | 0.90 | 0.93 | 0.91 |

TABLE 3

Starting weights, process conditions, and properties for comparative examples CE1-CE4 PreC, PostC, and IMTS

|  | mol % | PA10T/6T 35.2/64.8 | PA10T 100 | PA6T/6I 70/30 | PA6T/66 55/45 |
|---|---|---|---|---|---|
| Precondensate (PreC) |  | CE1-PreC | CE2-PreC |  |  |
| 1,6-Hexanediamine | g | 1584 |  |  |  |
| 1,10-Decanediamine | g | 1275 | 3230 |  |  |
| Terephthalic acid | g | 3424 | 3053 |  |  |
| Hypophosphorous acid (50% strength) | g | 8 | 8 |  |  |
| Benzoic acid | g | 32 | 32 |  |  |
| Water | g | 5175 | 5175 |  |  |
| Heating time | min | 67 | 50 |  |  |
| Product temperature | °C. | 260 | 260 |  |  |
| Pressure phase time | min | 45 | 60 |  |  |
| Pressure | bar | 32 | 32 |  |  |
| Postcondensate (PostC) |  | CE1-PostC | CE2-PostC | CE3-PostC | CE4-PostC |
| Cylinder temperature | °C. | 330 | 330 | 350 | 340 |
| Screw rotation rate | rpm | 150 | 150 | 150 | 150 |
| Throughput | kg/h | 4 | 4 | 7 | 7 |
| Relative viscosity |  | 1.428 | 1.842 | 1.556 | 1.729 |
| COOH | µeq/g | 367 | — | 186 | 129 |
| NH$_2$ | µeq/g | 20 | 42 | 69 | 85 |
| Melting point | °C. | 320 | 314 | 320 | 310 |
| Enthalpy of fusion | J/g | 44 | 46 | 40 | 45 |
| Glass transition temperature | °C. | 126 | 116 | 134 | 95 |
| Injection-molded test specimens (IMTS) |  | CE1-IMTS | CE2-IMTS | CE3-IMTS | CE4-IMTS |
| Cylinder temperatures, zone 1 | °C. | 325 | 330 | 325 | 315 |
| Cylinder temperatures, zone 2 | °C. | 330 | 335 | 330 | 320 |
| Cylinder temperatures, zone 3 | °C. | 335 | 340 | 335 | 325 |
| Cylinder temperatures, zone 4 | °C. | 340 | 355 | 340 | 330 |
| Mold temperature | °C. | 110 | 110 | 130 | 130 |
| Water absorption | % by wt. | 3.2 | 2.1 | 5.0 | 6.5 |
| Tensile modulus of elasticity, dry | MPa | 3050 | 2700 | 3850 | 3500 |
| Tensile modulus of elasticity, water-saturated | MPa | 3450 | 2950 | 4500 | 1050 |
| Modulus ratio |  | 1.13 | 1.09 | 1.17 | 0.30 |

TABLE 3-continued

Starting weights, process conditions, and properties for comparative examples CE1-CE4 PreC, PostC, and IMTS

| | mol % | PA10T/6T 35.2/64.8 | PA10T 100 | PA6T/6I 70/30 | PA6T/66 55/45 |
|---|---|---|---|---|---|
| Maximum tensile strength, dry | MPa | 48 | 91 | 81 | 93 |
| Maximum tensile strength, water-saturated | MPa | 48 | 85 | 64 | 48 |
| Strength ratio | | 1.00 | 0.93 | 0.79 | 0.52 |

Comparative example CE3-PostC and, respectively, CE4-PostC used a PA6T/6I precondensate whose solution viscosity is $\eta_{rel} = 1.14$ and, respectively, a PA6T/66 precondensate whose solution viscosity is $\eta_{rel} = 1.17$.

As can be seen from the graph in FIG. 1 of the results cited above, ideal melting points are obtained for the inventively claimed ratios of 1,10-decanediamine and 1,6-hexanediamine, a minimum being observed in the range from 60 to 70 mol % of 10T.

Figure 2:
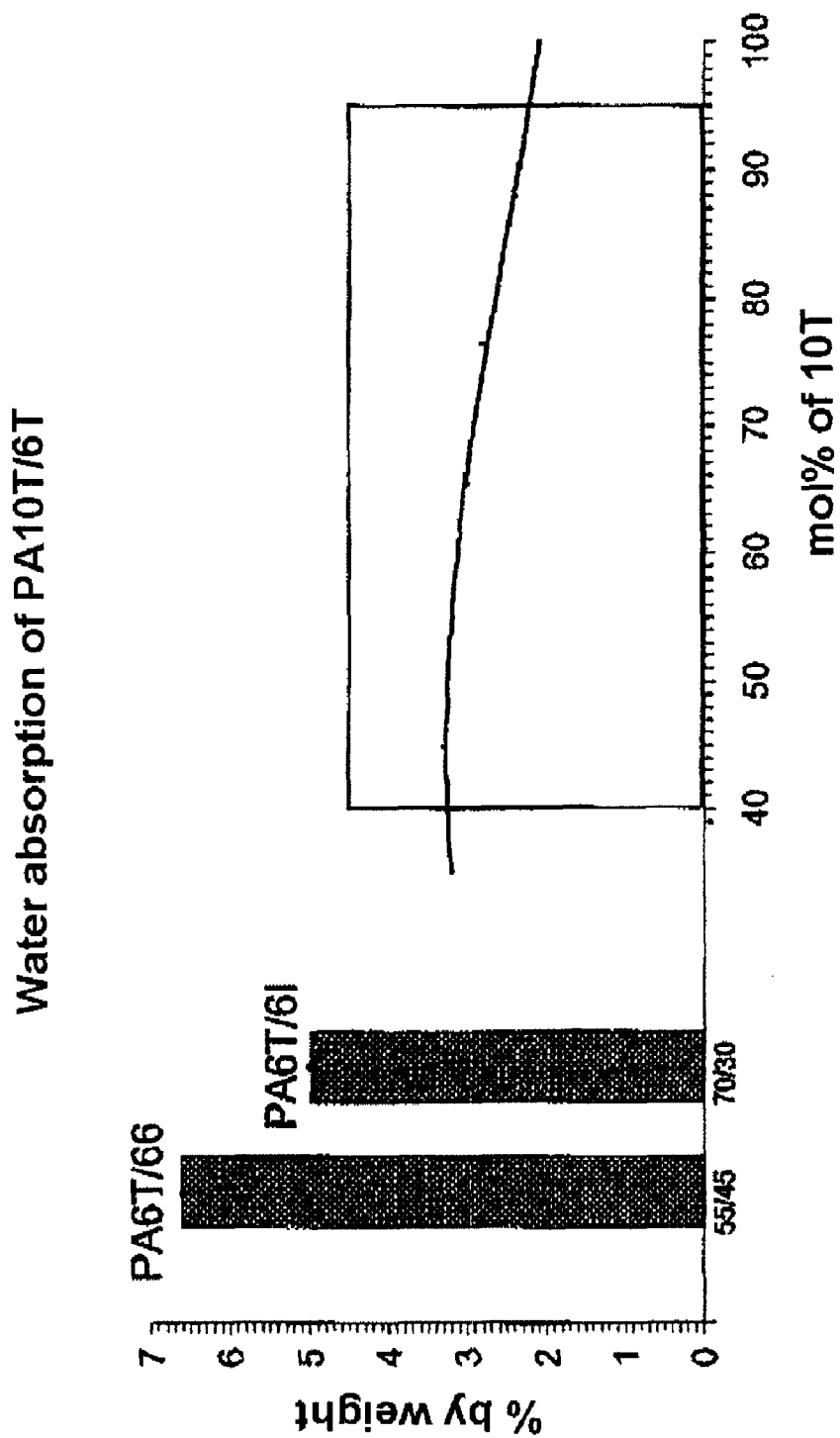
FIG. 2 shows the water absorption of PA 10T/6T.

As can be seen from the further graph provided in FIG. 2 of the results cited above, water absorption is always substantially greater for the systems in the comparative examples than for the polyamide molding compositions proposed in the invention. It can moreover be seen that a fall in water absorption can be observed for increasing 10T proportions. Both melting point and water absorption are parameters that have to be taken into account, and the result is therefore the inventively claimed ideal ranges.

TABLE 4

Starting weights, process conditions, and properties for comparative examples CE5-E8 PreC, PostC, and IMTS

| | mol % | PA66 100 | PA12 100 | PA6T/610 66/34 | PA6T/612 67/33 |
|---|---|---|---|---|---|
| Precondensate (PreC) | | | | CE7-PreC | CE8-PreC |
| 1,6-Hexanediamine | g | | | 2400 | 2400 |
| Terephthalic acid | g | | | 2203 | 2171 |
| Sebacic acid | g | | | 1382 | |
| Dodecanedioic acid | g | | | | 1482 |
| Na Hypophosphite | g | | | 6 | 6 |
| Benzoic acid | g | | | 13 | 13 |
| Water | g | | | 2600 | 2600 |
| Heating time | min | | | 54 | 55 |
| Product temperature | °C. | | | 260 | 260 |
| Pressure phase time | min | | | 90 | 90 |
| Pressure | bar | | | 32 | 32 |
| Postcondensate (PostC) | | CE5-PostC | CE6-PostC | CE7-PostC | CE8-PostC |
| Cylinder temperature | °C. | | | 370 | 370 |
| Screw rotation rate | rpm | | | 150 | 150 |
| Throughput | kg/h | | | 4 | 4 |
| Relative viscosity | | 1.94 | 2.19 | 1.149 | 1.156 |
| COOH | µeq/g | 104 | 5 | 50 | 40 |
| NH$_2$ | µeq/g | 55 | 39 | 85 | 76 |
| Melting point | °C. | 261 | 178 | 312 | 314 |
| Enthalpy of fusion | J/g | 49 | 49 | 45 | 41 |
| Glass transition temperature | °C. | 54 | 20 | 99 | 96 |
| Injection-molded test specimens (IMTS) | | CE5-IMTS | CE6-IMTS | CE7-IMTS | CE8-IMTS |
| Cylinder temperatures, zone 1 | °C. | 265 | 315 | 325 | 325 |
| Cylinder temperatures, zone 2 | °C. | 270 | 320 | 330 | 330 |
| Cylinder temperatures, zone 3 | °C. | 275 | 325 | 335 | 335 |
| Cylinder temperatures, zone 4 | °C. | 280 | 330 | 340 | 340 |
| Mold temperature | °C. | 80 | 115 | 120 | 120 |
| Water absorption | % by wt. | 7.6 | 2.3 | 5.2 | 4.5 |
| Tensile modulus of elasticity, dry | MPa | 3400 | 1500 | 3000 | 2900 |

TABLE 4-continued

Starting weights, process conditions, and properties for comparative examples CE5-E8 PreC, PostC, and IMTS

|  | mol % | PA66 100 | PA12 100 | PA6T/610 66/34 | PA6T/612 67/33 |
|---|---|---|---|---|---|
| Tensile modulus of elasticity, water-saturated | MPa | 850 | 1000 | 2500 | 2500 |
| Modulus ratio |  | 0.25 | 0.67 | 0.83 | 0.86 |
| Maximum tensile strength, dry | MPa | 91 | 50 | 99 | 91 |
| Maximum tensile strength, water-saturated | MPa | 49 | 47 | 62 | 62 |
| Strength ratio |  | 0.54 | 0.94 | 0.63 | 0.68 |

Comparative examples CE5 and CE6 are based on the following commercially available, high-molecular-weight polyamide-12 ($\eta_{rel}$ = 2.19, EMS-CHEMIE AG, Switzerland) and polyamide-6,6 ($\eta_{rel}$ = 1.94, RADICI, Italy) polymers. Comparative examples CE7 and CE8 show that although a combination of terephthalic acid with long-chain dicarboxylic acids can reduce water absorption, the modulus ratios and strength ratios are below those of the PA10T/6T copolyamides.

INVENTIVE EXAMPLES 8-10 (IE8-IE10), PreC

Diamine(s), terephthalic acid, catalyst, regulator, and water are placed in a dissolver and heated to 180° C., and, after homogenization of the monomer mixture, discharged into a feed vessel. The salt solution is continuously heated to 258° C. in two heat exchangers and kept at a pressure of 34 bar in a tubular reactor and then discharged by way of a nozzle. The precondensate is dried for 24 hours at 120° C. under a vacuum of 30 mbar.

INVENTIVE EXAMPLES 8-10 (IE8-IE10), PostC

The precondensate is postcondensed as in inventive examples 1-7 under the conditions listed in table 5.

TABLE 5

Starting weights, process conditions, and properties for inventive examples IE8-IE10, PreC and PostC

|  | mol % | PA10T/6T 49.9/50.1 | PA10T/6T 71.0/29.0 | PA10T/6T 82.2/17.8 |
|---|---|---|---|---|
| Precondensate (PreC) |  | IE8-PreC | IE9-PreC | IE10-PreC |
| 1,6-Hexanediamine | g | 29575 | 16485 | 9910 |
| 1,10-Decanediamine | g | 43630 | 59834 | 67816 |
| Terephthalic acid | g | 79567 | 76652 | 75045 |
| Hypophosphorous acid (50% strength) | g | 197 | 197 | 197 |
| Benzoic acid | g | 970 | 770 | 970 |
| Water | g | 66000 | 66000 | 66000 |

| Postcondensate (PostC) |  | IE8-PostC | IE9-PostC | IE10-PostC |
|---|---|---|---|---|
| Cylinder temperature | ° C. | 330 | 320 | 320 |
| Screw rotation rate | rpm | 150 | 200 | 200 |
| Throughput | kg/h | 4 | 4 | 4 |
| Relative viscosity |  | 1.77 | 1.81 | 1.68 |
| COOH | µeq/g | 34 | 46 | 34 |
| NH$_2$ | µeq/g | 133 | 155 | 141 |
| Melting point | ° C. | 301 | 282 | 294 |
| Enthalpy of fusion | J/g | 50 | 48 | 60 |
| Glass transition temperature | ° C. | 123 | 118 | 115 |

INVENTIVE EXAMPLES 11-15 (IE11-IE15) AND COMPARATIVE EXAMPLES 10 AND 11 (CE10 AND CE11)

The postcondensate from inventive examples IE8-IE10, PostC is compounded in a twin-screw extruder from Werner and Pfleiderer using a screw diameter of 25 mm with prescribed process parameters (barrel temperature, screw rotation rate, and throughput). The product is drawn off in the form of a strand from a die of 3 mm diameter, and pelletized. The pellets are dried for 24 hours at 120° C.

TABLE 6

Constitution and properties of the glassfiber-reinforced compounded materials of inventive example IE11 and of comparative example CE9

|  | mol % | PA10T/6T 49.9/50.1 | Grivory HTV-5H1 |
|---|---|---|---|
| Compounded material |  | IE11 | CE9 |
| IE8, PostC | % by wt. | 50.0 |  |
| Glass fibers | % by wt. | 50.0 |  |
| Barrel temperature | ° C. | 330 |  |
| Screw rotation rate | rpm | 150 |  |
| Throughput | kg/h | 8 |  |
| Injection-molded test specimens (IMTS) |  | IE11-IMTS | CE9-IMTS |
| Cylinder temperatures, zone 1 | ° C. | 325 | 325 |
| Cylinder temperatures, zone 2 | ° C. | 330 | 330 |
| Cylinder temperatures, zone 3 | ° C. | 335 | 335 |
| Cylinder temperatures, zone 4 | ° C. | 340 | 340 |
| Mold temperature | ° C. | 120 | 120 |
| Water absorption | % by wt. | 1.60 | 2.31 |
| Tensile modulus of elasticity, dry | MPa | 15800 | 18500 |
| Tensile modulus of elasticity, water-saturated | MPa | 15800 | 18600 |

TABLE 6-continued

Constitution and properties of the glassfiber-reinforced compounded materials of inventive example IE11 and of comparative example CE9

|  | mol % | PA10T/6T 49.9/50.1 | Grivory HTV-5H1 |
|---|---|---|---|
| Modulus ratio |  | 1.00 | 1.01 |
| Maximum tensile strength, dry | MPa | 219 | 263 |
| Maximum tensile strength, water-saturated | MPa | 192 | 221 |
| Strength ratio |  | 0.88 | 0.84 |
| HDT A (1.8 MPa) | ° C. | 274 | >280 |
| HDT C (8 MPa) | ° C. | 219 | 221 |

Grivory HTV-5H1 is a 50%-glassfiber-reinforced PA6T/6I, 70/30 mol %, from EMS-CHEMIE AG, Switzerland.
In inventive example 11 (IE11), glass fibers whose length is 4.5 mm and whose diameter is 10 μm were used (CS 7928 glass fiber, BAYER AG, Germany).

TABLE 7

Constitution and properties of the hybrid-reinforced compounded materials of examples IE12-IE13 and of the comparative examples CE10 and CE11.

|  | mol % | PA10T/6T 49.9/50.1 | PA10T/6T 82.2/17.8 | PA6T/6I 70/30 | PA10T 100 |
|---|---|---|---|---|---|
| Compounded material |  | IE12 | IE13 | CE10 | CE11 |
| IE8, PostC | % by wt. | 43.8 |  |  |  |
| IE10, PostC | % by wt. |  | 43.8 |  |  |
| PA6T/6I 70/30-PostC | % by wt. |  |  | 43.8 |  |
| CE2, PostC | % by wt. |  |  |  | 43.8 |
| Glass fibers | % by wt. | 35.0 | 35.0 | 35.0 | 35.0 |
| Millicarb (CaCO$_3$) | % by wt. | 20.0 | 20.0 | 20.0 | 20.0 |
| Carbon black masterbatch | % by wt. | 1.2 | 1.2 | 1.2 | 1.2 |
| Barrel temperature | ° C. | 320 | 320 | 340 | 315 |
| Screw rotation rate | rpm | 150 | 150 | 150 | 150 |
| Throughput | kg/h | 10 | 10 | 10 | 10 |
| Injection-molded test specimens (IMTS) |  | IE12-IMTS | IE13-IMTS | CE10-IMTS | CE11-IMTS |
| Cylinder temperatures, zone 1 | ° C. | 315 | 315 | 335 | 315 |
| Cylinder temperatures, zone 2 | ° C. | 320 | 320 | 340 | 320 |
| Cylinder temperatures, zone 3 | ° C. | 325 | 325 | 345 | 325 |
| Cylinder temperatures, zone 4 | ° C. | 340 | 340 | 350 | 340 |
| Mold temperature | ° C. | 150 | 150 | 150 | 150 |
| Tensile modulus of elasticity, dry | MPa | 14100 | 14500 | 16600 | 16300 |
| Maximum tensile strength, dry | MPa | 179 | 183 | 196 | 167 |
| Elongation at break, dry | % | 1.8 | 1.9 | 1.6 | 1.7 |
| Surface quality |  | good | good | very good | poor |
| HDT A (1.8 MPa) | ° C. | 267 | 269 | 277 |  |
| HDT C (8 MPa) | ° C. | 180 | 207 | 163 |  |

When straight PA10T is used for the hybrid-reinforced compounded materials, processing by injection molding is very difficult, because material freezes in the injection-molding nozzle, because of the high crystallization rate. The surface quality of 10 × 10 cm plaques is poor because of the high crystallinity, whereas that of the PA10T/6T copolyamides is substantially better.

TABLE 8

Constitution and properties of the impact-modified compounded materials of inventive examples IE14-IE15 and of the comparative example CE12.

|  | mol % | PA10T/6T 71.0/29.0 | PA10/6T 82.2/17.8 | Grilamid XE 3835 |
|---|---|---|---|---|
| Compounded material |  | IE14 | IE15 | CE12 |
| IE9, PostC | % by wt. | 77.5 |  |  |
| IE10, PostC | % by wt. |  | 77.5 |  |
| Tafmer MH7020 | % by wt. | 22.5 | 22.5 |  |
| Barrel temperature | °C. | 300 | 320 |  |
| Screw rotation rate | rpm | 200 | 200 |  |
| Throughput | kg/h | 10 | 10 |  |
| Injection-molded test specimens (IMTS) |  | IE14-IMTS | IE15-IMTS | CE12-IMTS |
| Cylinder temperatures, zone 1 | °C. | 315 | 315 | 265 |
| Cylinder temperatures, zone 2 | °C. | 320 | 320 | 270 |
| Cylinder temperatures, zone 3 | °C. | 325 | 325 | 275 |
| Cylinder temperatures, zone 4 | °C. | 330 | 330 | 280 |
| Mold temperature | °C. | 150 | 150 | 80 |
| Water absorption | % by wt. | 3.0 | 2.9 | 1.4 |
| Tensile modulus of elasticity, dry | MPa | 1540 | 1480 | 1230 |
| Tensile modulus of elasticity, water-saturated | MPa | 1590 | 1540 | 700 |
| Modulus ratio |  | 1.03 | 1.04 | 0.57 |
| Maximum tensile strength, dry | MPa | 52 | 50 | 45 |
| Maximum tensile strength, water-saturated |  | 44 | 43 | 44 |
| Strength ratio |  | 0.85 | 0.86 | 0.98 |
| HDT B (0.45 MPa) | °C. | 123 | 127 | 101 |
| HDT A (1.8 MPa) | °C. | 107 | 106 | 52 |
| 8 × 1 cm tubes |  |  |  |  |
| Rotation rate | rpm | 38 | 38 | 64 |
| Melt temperature | °C. | 308 | 310 | 258 |
| Take-off speed | m/min | 20 | 20 | 40 |
| Low-temperature impact, −40° C., 500 g | % | no fracture | 10% fracture | no fracture |
| Bursting pressure, 23° C. | bar | 75 | 91 | 99 |
| Bursting pressure, 130° C. | bar | 28 | 36 | 23 |
| Breaking stress | MPa | 42 | 45 | 32 |
| Elongation at break | % | 148 | 173 | 203 |

Grilamid XE 3835 is an impact-modified PA12 from EMS-CHEMIE AG, Switzerland.

Tubes of dimensions 8×1 mm were produced under the stated conditions from the products listed in table 8, using a BMA 60-24D Nokia Maillefer pipe extruder.

EXAMPLES USING FLAT GLASS FIBERS, INVENTIVE EXAMPLES IE16-IE18

TABLE 9

Constitution and properties of the compounded materials reinforced with flat glass fibers.

| Compounded material |  | IE16 | IE17 | IE18 |
|---|---|---|---|---|
| PA10T/6T (85/15), PostC | % by wt. | 37.7 | 37.7 | 47.7 |
| Glass fiber with circular cross section (NEG Ec03T-292H) |  | 60.0 |  |  |
| Flat glass fibers (NITTOBO CSG3PA-820) | % by wt. |  | 60.0 | 50.0 |
| Kaolin | % by wt. | 0.16 | 0.16 | 0.16 |
| KI/Ca stearate, 98/2 | % by wt. | 0.12 | 0.12 | 0.12 |
| CuJ | % by wt. | 0.02 | 0.02 | 0.02 |
| Barrel temperature | °C. | 330 | 330 | 330 |
| Screw rotation rate | rpm | 150 | 150 | 150 |
| Throughput | kg/h | 8 | 8 | 8 |
| Injection molded test specimens |  | IE16-IMTS | IE17-IMTS | IE18-IMTS |
| Cylinder temperatures, zone 1 | °C. | 325 | 325 | 325 |
| Cylinder temperatures, zone 2 | °C. | 330 | 330 | 330 |
| Cylinder temperatures, zone 3 | °C. | 335 | 335 | 335 |
| Cylinder temperatures, zone 4 | °C. | 340 | 340 | 340 |
| Mold temperature | °C. | 120 | 120 | 120 |
| Water absorption (240 h, 95° C.) | % by wt. | 1.12 | 0.96 | 1.50 |
| Tensile modulus of elasticity, dry | MPa | 20600 | 20700 | 16300 |
| Tensile modulus of elasticity, water-saturated | MPa | 20200 | 21300 | 17000 |
| Modulus ratio |  | 0.98 | 1.03 | 1.04 |
| Maximum tensile strength, dry | MPa | 225 | 240 | 241 |
| Maximum tensile strength, water-saturated | MPa | 184 | 213 | 223 |
| Strength ratio |  | 0.82 | 0.89 | 0.93 |
| HDT A (1.8 MPa) | °C. | 267 | >280 | 274 |
| HDT C (8 MPa) | °C. | 204 | 236 | 222 |
| *) Longitudinal tensile modulus of elasticity | MPa | 20600 | 19800 | 16200 |
| *) Transverse tensile modulus of elasticity | MPa | 9000 | 11200 | 9400 |
| Ratio of transverse tensile modulus of elasticity to longitudinal tensile modulus of elasticity | MPa | 0.44 | 0.57 | 0.58 |
| *) Longitudinal ultimate tensile strength | MPa | 226 | 229 | 230 |
| *) Transverse ultimate tensile strength | MPa | 77 | 115 | 115 |
| Ratio of transverse and longitudinal ultimate tensile strengths |  | 0.34 | 0.50 | 0.50 |

*) Mechanical properties were determined longitudinally and transversally with respect to the direction of injection molding with aid of the BIAX tensile specimen.
Flat glass fibers: NITTOBO CSG3PA-820, 3 mm long, 28 µm wide, 7 µm thick, aspect ratio of cross-sectional axes = 4, aminosilane size, NITTO BOSEKI, Japan (flat glass fibers for the purposes of the description above)
Inventive examples IE16 to IE18 are based on a postcondensate of the copolyamide PA10T/6T with a molar ratio of 85:15, which was prepared by analogy with the preceding inventive examples from the corresponding precondensate.

The compounded materials reinforced with flat glass fibers in particular have relatively high transverse stiffness and transverse strength, and also a relatively high HDT C value, in comparison with the conventionally reinforced compounded materials, i.e. those reinforced with glass fibers whose cross section is circular.

EXAMPLES OF FLAME-RETARDANT MOLDING COMPOSITIONS, INVENTIVE EXAMPLES IE19-IE21 AND COMPARATIVE EXAMPLES CE13 and CE14

TABLE 10

Constitution and properties of the compounded materials equipped with halogen-free flame-retardant system.

| Compounded material | | IE19 | IE20 | IE21 | CE13 | CE14 |
|---|---|---|---|---|---|---|
| PA10T/6T (85/15), PostC | % by wt. | 83.7 | 66.7 | 56.7 | | |
| PA8T/6T (75:25), PostC | % by wt. | | | | 83.7 | |
| PA12T, PostC | % by wt. | | | | | 83.7 |
| Alugel 34-TH (Al tristearate) | % by wt. | 0.3 | 0.3 | 0.3 | 0.3 | 0.3 |
| Exolit GP1230 | % by wt. | 15.0 | 12.0 | 12.0 | 15.0 | 15.0 |
| Melapur 200/70 | % by wt. | 0.5 | 0.5 | 0.5 | 0.5 | 0.5 |
| Irganox 1098 | % by wt. | 0.5 | 0.5 | 0.5 | 0.5 | 0.5 |
| Glass fiber (Vetrotex 995 EC10-4.5) | % by wt. | | 20.0 | 30.0 | | |
| Barrel temperature | ° C. | 330 | 330 | 330 | 330 | 330 |
| Screw rotation rate | rpm | 150 | 150 | 150 | 150 | 150 |
| Throughput | kg/h | 8 | 8 | 8 | 8 | 8 |
| Injection-molded test specimens | | IE19-IMTS | IE20-IMTS | IE21-IMTS | CE13-IMTS | CE14-IMTS |
| Cylinder temperatures, zone 1 | ° C. | 325 | 325 | 325 | 325 | 325 |
| Cylinder temperatures, zone 2 | ° C. | 330 | 330 | 330 | 330 | 330 |
| Cylinder temperatures, zone 3 | ° C. | 335 | 335 | 335 | 335 | 335 |
| Cylinder temperatures, zone 4 | ° C. | 340 | 340 | 340 | 340 | 340 |
| Mold temperature | ° C. | 120 | 120 | 120 | 120 | 120 |
| Water absorption (240 h, 95° C.) | | 2.1 | 1.6 | 1.4 | 2.9 | 1.9 |
| Tensile modulus of elasticity, dry | MPa | 3800 | 8100 | 10300 | 3800 | 3700 |
| Ultimate tensile strength, dry | MPa | 78 | 142 | 154 | 40 | 71 |
| Elongation at break, dry | % | 5.4 | 3.3 | 2.9 | 1.3 | 4.8 |
| UL94 fire classification (specimen thickness: 0.8 mm) | | V-0 | V-0 | V-0 | V-2 | V-2 |

Melapur ® 200/70: a melamine polyphosphate (Ciba Spez. GmbH), flame retardant CAS No. 218768-84-4
Exolit ® GP1230: an organophosphorus salt (Clariant Produkte GmbH), flame retardant.

The examples IE19 to IE21 are based on a postcondensate of the copolyamide PA10T/6T with a molar ratio of 85:15, prepared by analogy with the preceding inventive examples from the corresponding precondensate.

The halogen-free flame-retardant molding compositions of inventive examples 19 to 21 are reliably V-0, with and without glassfiber reinforcement, whereas the molding compositions of CE13 and CE14 achieve merely the UL classification V-2, despite identical flame-retardant modification.

What is claimed is:

1. A polyamide molding composition with the following constitution:
   (A) from 30 to 100% by weight of at least one copolyamide 10T/6T, wherein this is composed of
      (A1) from 40 to 95 mol % of 10T units, formed from the monomers 1,10-decanediamine and terephthalic acid
      (A2) from 5 to 60 mol % of 6T units, formed from the monomers 1,6-hexanediamine and terephthalic acid
   (B) from 0 to 70% by weight of reinforcing materials and/or fillers
   (C) from 0 to 50% by weight of additives and/or further polymers where the entirety of components A to C is 100%,
   with the proviso that in component (A), independently of one another, in (A1) and/or (A2) up to 30 mol %, based on the entirety of the dicarboxylic acids, of the terephthalic acid are replaced by other aromatic, aliphatic, or cycloaliphatic dicarboxylic acids having from 6 to 36 carbon atoms, and with the proviso that in component (A), independently of one another, in (A1) and/or (A2) up to 30 mol % of 1,10-decanediamine and respectively 1,6-hexanediamine, based on the entirety of the diamines, are replaced by other diamines having from 4 to 36 carbon atoms, and with the proviso that up to 30 mol % in component (A), based on the entirety of the monomers, are formed via lactams or amino acids, and with the proviso that the concentration of the entirety of the monomers which replace the terephthalic acid, 1,6-hexanediamine, and 1,10-decanediamine does not exceed 30 mol %, based on the entirety of the monomers used in component A.

2. The polyamide molding composition as claimed in claim 1, wherein the melting point and respectively the temperature of deflection to ISO-R 75, method A (DIN 53 461) of component (A) or the entire polyamide molding composition is above 260° C.

3. The polyamide molding composition as claimed in claim 1, wherein the water absorption of component (A) and of the entire polyamide molding composition is less than 5% by weight, after 240 h in water at 95° C.

4. The polyamide molding composition as claimed in claim 1, wherein the ratio of wet:dry tensile moduli of elasticity is greater than or equal to 0.95.

5. The polyamide molding composition according to claim 1, wherein the ratio of wet:dry maximum tensile strengths is greater than or equal to 0.85.

6. The polyamide molding composition as claimed in claim 1, wherein, within component (A), the (A1) fractions make up from 40 to 90 mol % and the (A2) fractions make up from 10 to 60 mol %.

7. The polyamide molding composition according to claim 1, wherein the 10T/6T copolyamide of component (A) is based in essence exclusively, on terephthalic acid as dicarboxylic acid.

8. The polyamide molding composition as claimed in claim 1, wherein the other aromatic, aliphatic, or cycloaliphatic dicarboxylic acids having from 6 to 36 carbon atoms, which to some extent replace the terephthalic acid, are selected from the group consisting of: naphthalenedicarboxylic acid (NDA), isophthalic acid (IPS), adipic acid, suberic acid, azaleic acid, sebacic acid, undecanedioic acid, dodecanedioic acid, brassylic acid, tetradecanedioic acid, pentadecanedioic acid, hexadecanedioic acid, octadecanedioic acid, dimer acid, cis- and/or trans-cyclohexane-1,4-dicarboxylic acid, cis- and/or trans-cyclohexane-1,3-dicarboxylic acid (CHDA), and combinations thereof.

9. The polyamide molding composition as claimed in claim 8, wherein, for a higher glass transition temperature, the other aromatic, aliphatic, or cycloaliphatic dicarboxylic acids having from 6 to 36 carbon atoms, which to some extent replace the terephthalic acid, Are selected from the following group: naphthalenedicarboxylic acid (NDA), isophthalic acid (IPS), trans-cyclohexane-1,3-dicarboxylic acid (CHDA) or combinations thereof, and for a lower glass transition temperature they are selected from the following group: dodecanedioic acid, brassylic acid, tetradecanedioic acid, pentadecanedioic acid, hexadecanedioic acid, octadecanedioic acid, dimer acid, or combinations thereof.

10. The polyamide molding composition as claimed in claim 1, wherein the 10T/6T copolyamide of component (A) is based in essence exclusively, on 1,10-decanediamine for (A1) and 1,6-hexanediamine for (A2), as diamine.

11. The polyamide molding composition as claimed in claim 1, wherein the other diamines having from 4 to 36 carbon atoms which in component (A), independently of one another, in (A1) and/or (A2) replace up to 30 mol % of 1,10-decanediamine and respectively 1,6-hexanediamine, based on the entirety of the diamines, are selected from the following group: linear or branched, aliphatic diamines, selected from the group 1,4-butanediamine, 1,5-pentanediamine, 2-methyl-1,5-pentanediamine (MPMD), 1,8-octanediamine (OMDA), 1,9-nonanediamine (NMDA), 2-methyl-1,8-octanediamine (MODA), 2,2,4-trimethyl hexamethylenediamine (TMHMD), 2,4,4-trimethylhexamethylenediamine (TMHMD), 5-methyl-1,9-nonanediamine, 1,11-tridecanediamine, 2-butyl-2-ethyl-1,5-pentanediamine, 1,12-dodecanediamine, 1,13-tridecanediamine, 1,14-tetradecanediamine, 1,16-hexadecanediamine, 1,18-octadecanediamine, cycloaliphaticdiamines selected from the group cyclohexanediamine, 1,3-bis(aminomethyl)cyclohexane (BAC), isophoronediamine, norbornanedimethylamine, 4,4'-diaminodicyclohexylmethane (PACM), 2,2-(4,4'-diaminodicyclohexyl)propane (PACP), and 3,3'-dimethyl-4,4'-diaminodicyclohexylmethane (MACM), m-xylylenediamine (MXDA), and combinations thereof.

12. The polyamide molding composition as claimed in claim 11, wherein, for a higher glass transition temperature, the other diamines having from 4 to 36 carbon atoms which in component (A), independently of one another, in (A1) and/or (A2) replace up to 30 mol % of 1,10-decanediamine and respectively 1,6-hexanediamine, based on the entirety of the diamines, are selected from the following group:2-methyl-1,5-pentanediamine (MPMD), 2-methyl-1,8-octanediamine (MODA), 2,2,4-trimethylhexamethylenediamine (TMHMD), 1,3-bis (aminomethyl)cyclohexane (BAC), 4,4'-diaminodicyclohexylmethane (PACM), 3,3'-dimethyl-4,4'-diaminodicyclohexylmethane (MACM), and combinations thereof, and, for a lower glass transition temperature they are selected from the following group: 1,12-dodecanediamine, 1,13-tridecanediamine, 1,14-tetradecanediamine, 1,16-hexadecanediamine, 1,18-octadecanediamine, and combinations thereof.

13. The polyamide molding composition as claimed in claim 1, wherein component (A) is in essence exclusively composed of the constituents (A1) and (A2).

14. The polyamide molding composition as claimed in claim 1, wherein the lactams or amino acids are selected from the following group: caprolactam (CL), α,ω-aminocaproic acid, α,ω-aminononanoic acid, α,ω-aminoundecanoic acid (AUA), laurolactam (LL), ω-aminododecanoic acid (ADA), and combinations of these.

15. The polyamide molding composition as claimed in claim 1, wherein component (B) is at least to some extent glass fibers or carbon fibers.

16. The polyamide molding composition as claimed in claim 15, wherein component (B) involves short fibers or continuous-filament fibers in the form of glass.

17. The polyamide molding composition as claimed in claim 16, which involves short fibers or continuous-filament glass fibers whose diameter is from 10 to 14.

18. The polyamide molding composition as claimed in claim 1, wherein component (C) involves additives or further polymers selected from the following group: impact modifiers, adhesion promoters or compatibilizers, crystallization accelerators or crystallization retarders, flow aids, lubricants, mold-release agents, pigments, dyes and markers, plasticizers, stabilizers, processing aids, flame-retardant additions, halogen-free flame-retardant additions, antistatic agents, nanoparticles in lamellar form, and conductivity additives selected from carbon black, graphite powder, or carbon nanofibrils, residues from polymerization processes.

19. The polyamide molding composition as claimed in claim 1, wherein the concentration of the entirety of the monomers which replace terephthalic acid, 1,6-hexanediamine, and 1,10-decanediamine does not exceed 20 mol %, based on the entirety of the monomers used in component A.

20. A polyamide mixture comprising a polyamide molding composition as claimed in claim 1.

21. A polyamide mixture comprising a polyamide molding composition as claimed in claim 1 and polyphenylene ether, in the form of homopolymers, of copolymer, of graft copolymers, of block copolymer, or of ionomers, selected from the group poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether.

22. A pelletized material, composed of a polyamide molding composition as claimed in claim 1, for use in a moist or wet environment.

23. A powder composed of a polyamide molding composition as claimed in claim 1, with an average grain size of from 30 to 200 μm.

24. The powder as claimed in claim 23, whose solution viscosity at 0.5% by weight in m-cresol at 20° C. is in the range from 1.3 to 2.0.

25. The powder as claimed in claim 23, which involves a mixture of oppositely difunctionally regulated PA10T/6T composed of separately amine-regulated and carboxy-regulated powder particles.

26. The powder as claimed in claim 23, which comprises, alongside 10T/6T copolyamide particles, a further filler.

27. A method of selective laser sintering using a powder as claimed in claim 23.

28. A molding produced using a polyamide molding composition as claimed in claim 1.

29. A process for the preparation of a polyamide molding composition as claimed in claim 1, which comprises adding, to the mononomer mixtures, during the preparation of component (A), a proportion of from 0.005 to 1.5% by weight of at least one polycondensation catalyst, selected from the group phosphoric acid, phosphorous acid, hypophosphorous acid, phenylphosphonic acid, phenylphosphinic acid, or salts thereof with cations of valency from 1 to 3, e.g. Na, K, Mg, Ga, Zn, or Al, or their esters, selected from the group triphenyl phosphate, triphenyl phosphite, or tris(nonylphenyl) phosphite, or a mixture thereof.

30. The process as claimed in claim 29, wherein the polycondensation catalyst involves hypophosphorous acid and sodium hydrogen hypophosphite monohydrate in an amount of from 100 to 500 ppm of phosphorus, based on the semi-aromatic 10T/6T copolyamide (A).

31. The process as claimed in claim 29, wherein, to compensate diamine loss, a diamine excess of from 1 to 8% by weight, based on the entirety of the diamines, is added to the monomer mixture.

32. The process as claimed in claim 29, wherein, for regulation of the molar mass, of the relative viscosity and respectively of the flowability or the MVR, regulators are added to the mixture or to the precondensate and these involve monoacids or monoamines, selected from the following group: aliphatic, cycloaliphatic or aromatic monocarboxylic acids, or monoamines, selected from acetic acid, propionic acid, butyric acid, valeric acid, caproic acid, lauric acid, stearic acid, 2-ethylhexanoic acid, cyclohexanoic acid, benzoic acid, butylamine, pentylamine, hexylamine, 2-ethylhexylamine, n-octylamine, n-dodecylamine, n-tetradecylamine, n-hexadecylamine, stearylamine, cyclohexylamine, 3-(cyclohexylamino) propylamine, methylcyclohexylamine, dimethylcyclohexylamine, benzylamine, 2-phenylethylamine, and respectively combinations thereof, or monofunctional compounds which can react with an amino group or acid group, selected from anhydrides, isocyanates, acyl halides, or esters, and respectively combinations of these, where the amount used of the regulators is from 10 to 200 mmol/kg-regulator/polymer.

* * * * *